United States Patent
Jo et al.

(10) Patent No.: US 12,452,505 B2
(45) Date of Patent: Oct. 21, 2025

(54) ELECTRONIC DEVICE COMPRISING A PLURALITY OF IMAGING OPTICAL SYSTEMS

(71) Applicant: Samsung Electronics Co., Ltd., Suwon-si (KR)

(72) Inventors: Kiyun Jo, Suwon-si (KR); Heeyun Chung, Suwon-si (KR); Jungpa Seo, Suwon-si (KR); Hwanseon Lee, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 18/484,825

(22) Filed: Oct. 11, 2023

(65) Prior Publication Data

US 2024/0048825 A1 Feb. 8, 2024

Related U.S. Application Data

(63) Continuation of application No. PCT/KR2022/006549, filed on May 9, 2022.

(30) Foreign Application Priority Data

May 27, 2021 (KR) .......................... 10-2021-0068171

(51) Int. Cl.
*H04N 5/335* (2011.01)
*G03B 17/17* (2021.01)
(Continued)

(52) U.S. Cl.
CPC ............. *H04N 23/45* (2023.01); *G03B 17/17* (2013.01); *H04N 23/51* (2023.01); *H04N 23/55* (2023.01); *H04N 23/69* (2023.01)

(58) Field of Classification Search
CPC ................................ H04N 23/45; G03B 17/17
See application file for complete search history.

(56) References Cited

U.S. PATENT DOCUMENTS

| 10,412,298 B2 | 9/2019 | Li |
| 2006/0092505 A1 | 5/2006 | Abnet et al. |

(Continued)

FOREIGN PATENT DOCUMENTS

| JP | 2003298920 A | * 10/2003 |
| JP | 2008-519499 A | 6/2008 |

(Continued)

OTHER PUBLICATIONS

International Search Report dated Aug. 9, 2022, issued in International Application No. PCT/KR2022/006549.

(Continued)

*Primary Examiner* — Gary C Vieaux
(74) *Attorney, Agent, or Firm* — Jefferson IP Law, LLP

(57) ABSTRACT

An electronic device is provided. The electronic device includes a first imaging optical system including a first image sensor, and a second imaging optical system including a second image sensor, a reflective member, a first lens group, a second lens group, and a third lens group, the first, second, and third lens groups being sequentially arranged from the reflective member to the second image sensor, the second and third lens groups being configured to slide with respect to the first lens group, and the first and second imaging optical systems being configured to satisfy a conditional expression SSW/SST>2, where SSW denotes a size of the first image sensor and SST denotes a size of the second image sensor.

14 Claims, 13 Drawing Sheets

(51) Int. Cl.
  *H04N 23/45* (2023.01)
  *H04N 23/51* (2023.01)
  *H04N 23/55* (2023.01)
  *H04N 23/69* (2023.01)

(56) References Cited

U.S. PATENT DOCUMENTS

| | | |
|---|---|---|
| 2008/0088942 A1 | 4/2008 | Seo |
| 2008/0158393 A1* | 7/2008 | Taoka .................. H04N 23/69 348/240.1 |
| 2011/0141576 A1* | 6/2011 | Seo .................... G02B 13/0045 359/683 |
| 2013/0155201 A1 | 6/2013 | Fukugawa et al. |
| 2017/0085764 A1 | 3/2017 | Kim et al. |
| 2017/0111589 A1 | 4/2017 | Park |
| 2018/0255220 A1* | 9/2018 | Ichihara .............. H04N 23/671 |
| 2019/0086638 A1* | 3/2019 | Lee ...................... H04N 23/687 |
| 2019/0230291 A1 | 7/2019 | Shabtay et al. |
| 2020/0028999 A1 | 1/2020 | Jun |
| 2021/0018957 A1 | 1/2021 | Cho |
| 2021/0063702 A1 | 3/2021 | Kim et al. |
| 2023/0336848 A1* | 10/2023 | Bachar ............... G02B 27/1013 |

FOREIGN PATENT DOCUMENTS

| | | |
|---|---|---|
| JP | 2013-123215 A | 6/2013 |
| KR | 10-1997-0048898 A | 7/1997 |
| KR | 10-2007-0082218 A | 8/2007 |
| KR | 10-2010-0036472 A | 4/2010 |
| KR | 10-2011-0056864 A | 5/2011 |
| KR | 10-2015-0029897 A | 3/2015 |
| KR | 10-2017-0035237 A | 3/2017 |
| KR | 10-2019-0032905 A | 3/2019 |
| KR | 10-2020-0009868 A | 1/2020 |
| KR | 10-2020-0092580 A | 8/2020 |

OTHER PUBLICATIONS

Korean Office Action dated Sep. 3, 2025, issued in Korean Application No. 10-2021-0068171.

* cited by examiner

ELECTRONIC DEVICE COMPRISING A PLURALITY OF IMAGING OPTICAL SYSTEMS

CROSS-REFERENCE TO RELATED APPLICATION(S)

This application is a continuation application, claiming priority under § 365(c), of an International application No. PCT/KR2022/006549, filed on May 9, 2022, which is based on and claims the benefit of a Korean patent application number 10-2021-0068171, filed on May 27, 2021, in the Korean Intellectual Property Office, the disclosure of which is incorporated by reference herein in its entirety.

BACKGROUND

1. Field

The disclosure relates to an electronic device including an imaging optical system.

2. Description of Related Art

With the development of information and communication technology and semiconductor technology, various functions are being integrated into one portable electronic device. For example, an electronic device may implement not only communication functions but also entertainment functions, such as playing games, multimedia functions, such as image capture, playing music and videos, communication and security functions for mobile banking, and scheduling and e-wallet functions. Such electronic devices have become compact enough for users to conveniently carry them.

Optical devices, e.g., cameras capable of capturing images or videos have been widely used. Recently, digital cameras or video cameras using a solid-state image sensor, such as a charge coupled device (CCD) type image sensor or complementary metal-oxide semiconductor (CMOS) type image sensor, have been used. Solid image sensor (CCD or CMOS)-adopted optical devices may be suitable for miniaturization and may easily save, copy, or transmit images as compared with film-type optical devices.

To obtain high-quality images and/or videos, a plurality of lenses may be put to use. A lens assembly, for example a combination of multiple lenses, has lower F-number and smaller aberration and thus enables obtaining higher-quality (higher-resolution) images and/or videos. Multiple lenses may be required to achieve low F-number and low aberrations. Optical devices have typically been configured for devices specialized for image capturing, such as digital cameras, but are being equipped in compact electronic devices such as mobile communication terminals.

The above information is presented as background information only to assist with an understanding of the disclosure. No determination has been made, and no assertion is made, as to whether any of the above might be applicable as prior art with regard to the disclosure.

SUMMARY

Electronic devices with communication functionality, such as portable terminals, are being reduced in size and weight to maximize user portability and convenience and, for high performance, integrated components are packed into a small space. However, to mount an optical device, such as an imaging optical system, in a compact electronic device, it is necessary to reduce the total length (e.g., the total length and/or height in the optical axis direction) of the imaging optical system, and thus the structure for moving the lens of the imaging optical system may be limited.

To capture subjects in various ranges of viewing angle, a camera module may include a plurality of imaging optical systems. However, each of the plurality of imaging optical systems has a different angle of view range, and the angle of view for the imaging optical system may be adjusted using digital zoom. Nevertheless, adjusting the angle of view using digital zoom may result in reduction in the obtained image's quality.

Aspects of the disclosure are to address at least the above-mentioned problems and/or disadvantages and to provide at least the advantages described below. Accordingly, an aspect of the disclosure is to provide an electronic device that selectively uses one of a plurality of imaging optical systems having different angles of view.

Another aspect of the disclosure is to provide an electronic device including an imaging optical system capable of obtaining high-quality images and/or videos while being disposed in a compact electronic device by moving a lens of an imaging optical system and optically adjusting an angle of view.

Additional aspects will be set forth in part in the description which follows and, in part, will be apparent from the description, or may be learned by practice of the presented embodiments.

In accordance with an aspect of the disclosure, an electronic device is provided. The electronic device includes a first imaging optical system including a first image sensor, and a second imaging optical system including a second image sensor, a reflective member, a first lens group, a second lens group, and a third lens group, wherein the first, second, and third lens groups are sequentially arranged from the reflective member to the second image sensor, wherein the second and third lens groups are configured to slide with respect to the first lens group, wherein the first and second imaging optical systems are configured to satisfy a conditional expression SSW/SST>2, and wherein SSW denotes a size of the first image sensor and SST denotes a size of the second image sensor.

In accordance with another aspect of the disclosure, an electronic device is provided. The electronic device includes a first image sensor, a first imaging optical system for capturing a first angle of view range, a second image sensor, a reflective member, a second imaging optical system for capturing a second angle of view range that is smaller than the first angle of view range, and a processor configured to adjust a size of an image in which an external object is captured using a crop in the first angle of view range, wherein the second imaging optical system may include a first lens group, a second lens group, and a third lens group that are arranged sequentially from the reflective member to the second image sensor, wherein the second lens group and the third lens group may be configured to slide with respect to the first lens group in the second angle of view range, wherein the first imaging optical system and the second imaging optical system may be configured to satisfy a conditional expression SSW/SST>2, and wherein SSW denotes the size of the first image sensor, and SST denotes the size of the second image sensor.

The electronic device according to various embodiments of this disclosure may optically adjust the angle of view of an imaging optical system by moving certain lens groups among a plurality of lens groups. As the angle of view is optically adjusted, image quality deterioration of the obtained image may be reduced.

Furthermore, the disclosure may provide various effects that can be directly or indirectly perceived.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
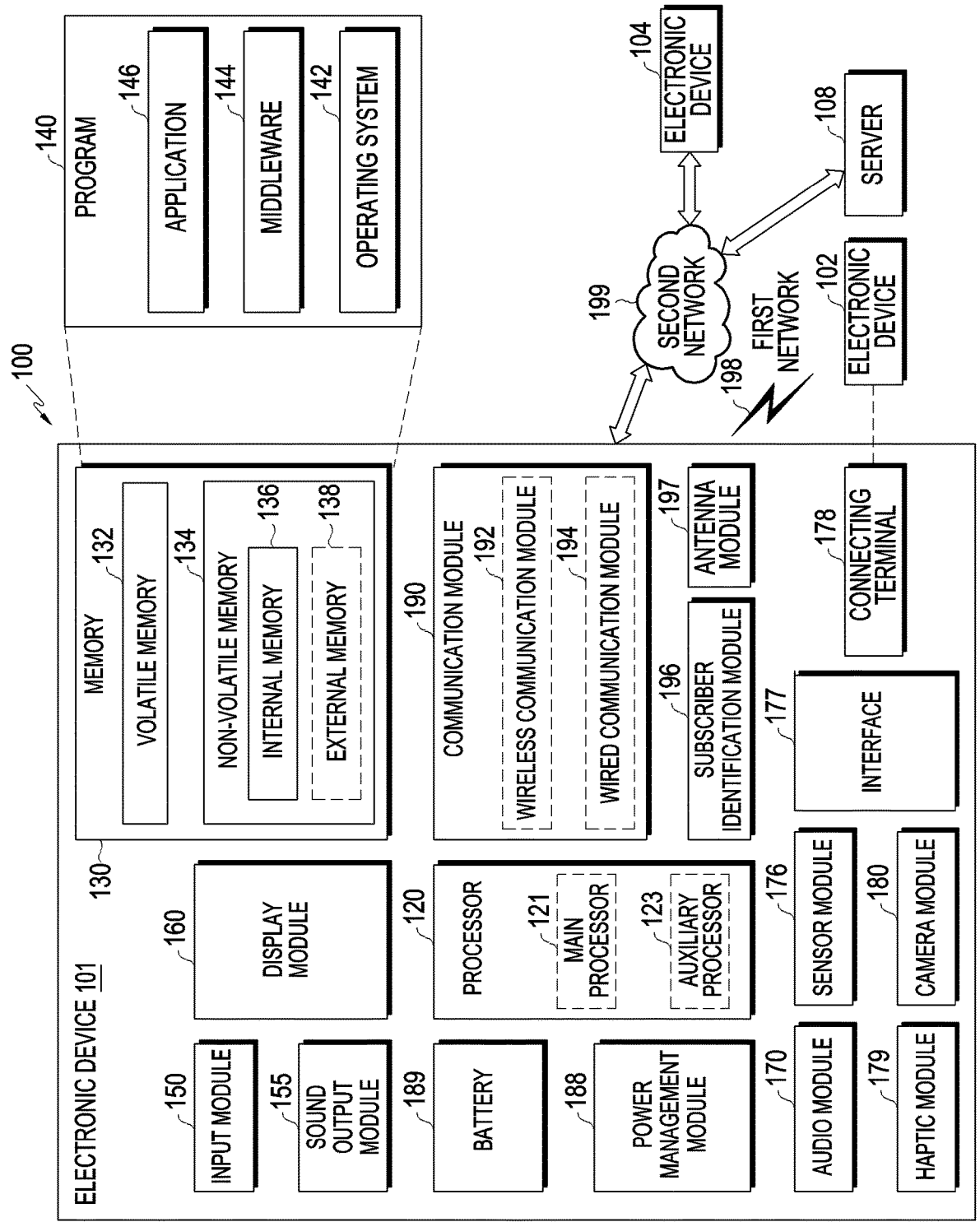
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160). The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for deep learning model processing. The deep learning model may be generated via machine learning. Such learning may be performed, e.g., by the electronic device 101 where the deep learning model is performed or via a separate server (e.g., the server 108). Learning algorithms may include, but are not limited to, e.g., supervised learning, unsupervised learning, semi-supervised learning, or reinforcement learning. The deep learning model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The deep learning model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory may include at least one of an internal memory 136 or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices (e.g., electronic devices 102 and 104 or the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
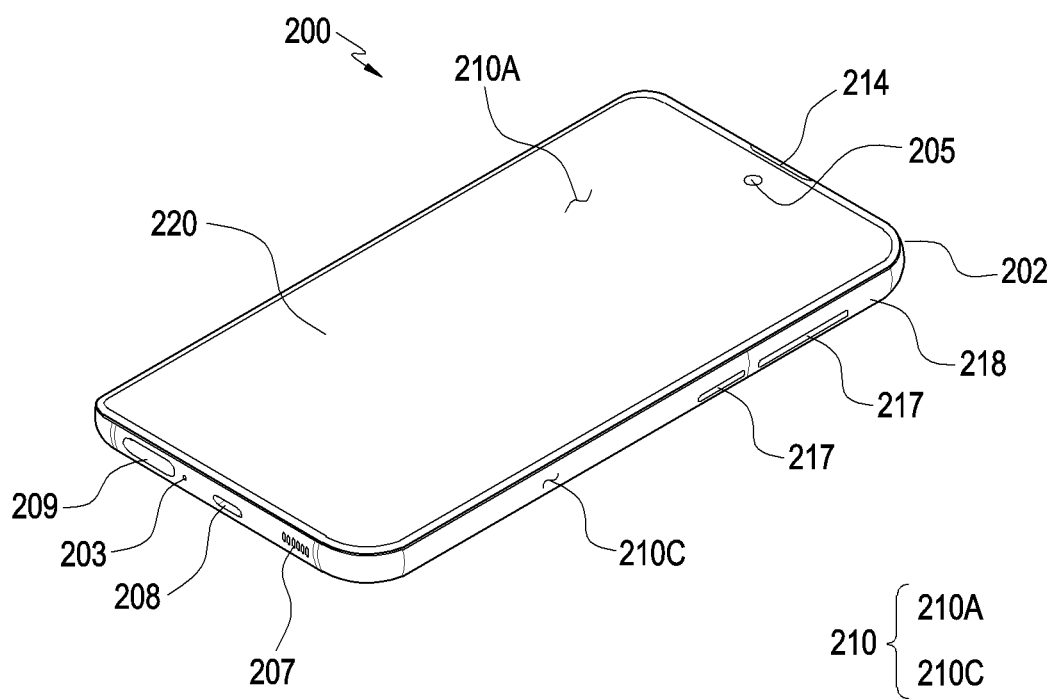
FIG. 2 is a front perspective view of an electronic device according to an embodiment of the disclosure.
Figure 3:
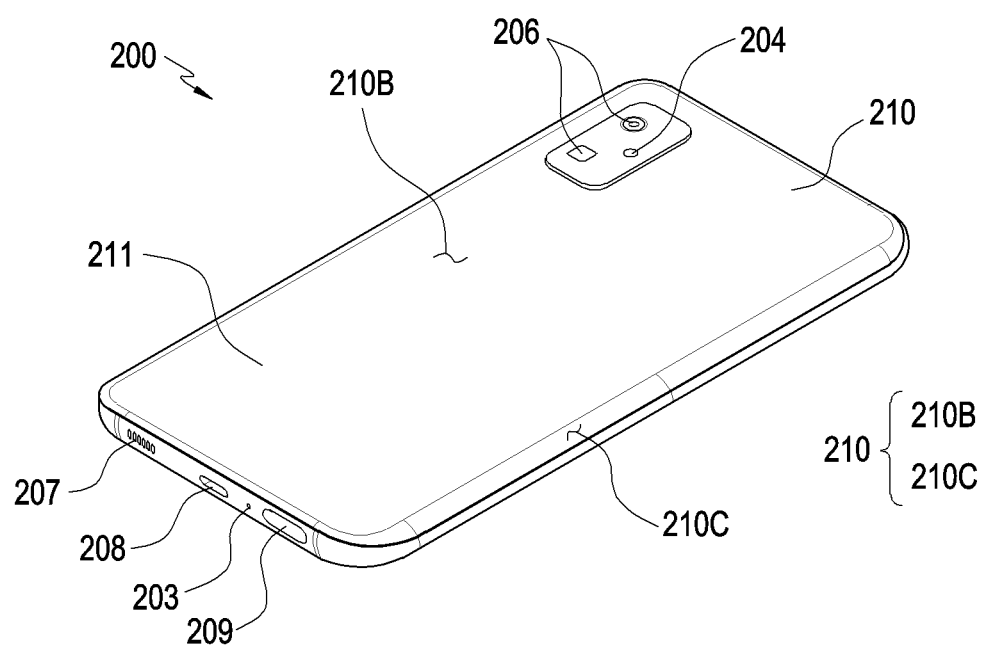
FIG. 3 is a rear perspective view of an electronic device according to an embodiment of the disclosure.

FIG. 2 is a front perspective view of an electronic device according to an embodiment of the disclosure. FIG. 3 is a rear perspective view of an electronic device according to an embodiment of the disclosure.

Referring to FIGS. 2 and 3, an electronic device 200 according to an embodiment may include a housing 210 including a front surface 210A, a rear surface 210B, and a side surface 210C which surrounds the space between the front surface 210A and the rear surface 210B. In another embodiment (not illustrated), the housing 210 may refer to a structure configuring a part of the front surface 210A in FIG. 2, and the rear surface 210B and the side surface 310C in FIG. 3. According to an embodiment, at least a portion of the front surface 210A may be formed by a front plate 202 (e.g., a glass plate including various coating layers, or a polymer plate) which is substantially transparent. The rear surface 210B may be configured by a rear plate 211. The rear plate 211 may be made of, for example, glass, ceramic, a polymer, a metal (e.g., aluminum (Al), stainless steel (STS), and/or magnesium (Mg)), or a combination of at least two of the above materials. The side surface 210C may be configured by a side bezel structure 218 (or "side surface member") which is coupled to the front plate 202 and the rear plate 211 and includes a metal and/or a polymer. In some embodiments, the rear plate 211 and side bezel structure 218 may be integrally formed with each other and include the same material (e.g., glass, a metal material such as aluminum, or ceramic). In another embodiment, the front surface 210A and/or the front plate 202 may be understood as a part of a display 220.

According to one embodiment, the electronic device 200 may include at least one of the display 220, audio modules 203, 207, and 214 (e.g., the audio module 170 of FIG. 1), a sensor module (e.g., the sensor module 176 of FIG. 1), camera modules 205 and 206 (e.g., the camera module 180 of FIG. 1), key input devices 217 (e.g., the input module 150 of FIG. 1), and connector holes 208 and 209 (e.g., the connecting terminal 178 of FIG. 1). In some embodiments, at least one of the elements (e.g., the connector hole 209) may be omitted from the electronic device 200 or another element may be added thereto. According to one embodiment, the display 220 may be visually exposed through, for example, a substantial portion of the front plate 202.

According to an embodiment, the surface (or the front plate 202) of the housing 210 may include a screen display region formed when the display 220 is visually exposed. For example, the screen display region may include the front surface 210A.

According to an embodiment, the housing 210 may accommodate at least a portion of a first imaging optical system (e.g., first imaging optical system 300 of FIGS. 5 and 6) and a second imaging optical system (e.g., second imaging optical system 400 of FIGS. 5, 8A, 8B, 10A, and 10B).

In another embodiment (not illustrated), the electronic device 200 may include a recess or opening disposed in a portion of the screen display area (e.g., the front surface 210A) of the display 220, and may include at least one of the audio module 214 aligned with the recess or opening, a sensor module (not illustrated), a light-emitting element (not illustrated), and the camera module 205. In another embodiment (not illustrated), the rear surface of the screen display region of the display 220 may include at least one of the audio module 214, a sensor module (not illustrated), the camera module 205, a fingerprint sensor (not illustrated), and a light-emitting element (not illustrated).

In another embodiment (not illustrated), the display 220 may be coupled to or disposed adjacent to a touch sensing circuit, a pressure sensor capable of measuring the intensity (pressure) of a touch, and/or a digitizer configured to detect a magnetic field type stylus pen.

In some embodiments, at least one of the key input devices 217 may be disposed on the side bezel structure 218.

According to one embodiment, the audio modules 203, 207, and 214 may include, for example, a microphone hole 203 and speaker holes 207 and 214. The microphone hole 303 may include a microphone disposed inside thereof and configured to acquire external sound, and in some embodiments, may include a plurality of microphones arranged to sense the direction of sound. The speaker holes 207 and 214 may include an external speaker hole 207 and a call receiver hole 214. In some embodiments, the speaker holes 207 and 214 and the microphone hole 203 may be implemented as a single hole, or a speaker may be included without the speaker holes 207 and 214 (e.g., a piezo speaker).

According to one embodiment, the sensor module (not illustrated) may generate an electrical signal or a data value corresponding to, for example, an internal operation state of the electronic device 200 or an external environment state. The sensor module (not illustrated) may include, for example, a first sensor module (not illustrated) (e.g., a proximity sensor) and/or a second sensor module (not illustrated) (e.g., a fingerprint sensor) disposed on the front surface 210A of the housing 210. The sensor module (not illustrated) may include a third sensor module (not illustrated) (e.g., a HRM sensor) and/or a fourth sensor module (not illustrated) (e.g., a fingerprint sensor) disposed on the rear surface 210B of the housing 210. In some embodiments (not illustrated), the fingerprint sensor may be disposed not only on the front surface 210A (e.g., the display 220) of the housing 210 but also on the rear surface 210B thereof. The electronic device 200 may further include a sensor module (not illustrated), for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor (not illustrated).

According to an embodiment, the camera modules 205 and 206 may include, for example, a front camera module 205 disposed on the front surface 210A of the electronic device 200, and/or a rear camera module 206 disposed on the rear surface 210B thereof. The camera modules 205 and 206 may include one or more lenses, an image sensor, and/or an image signal processor. In some embodiments, two or more lenses (an infrared camera, and a wide-angle and telephoto lens) and image sensors may be disposed on one surface of the electronic device 200.

According to an embodiment, the electronic device 200 may include a flash 204. The flash 204 may include, for example, a light-emitting diode or a xenon lamp.

According to an embodiment, the key input devices 217 may be disposed on the side surface 210C of the housing 210. In another embodiment, the electronic device 200 may not include some or all of the key input devices 217 mentioned above, and at least one key input device 217 which is not included therein may be implemented in a different form, such as a soft key, on the display 220.

According to an embodiment, the light-emitting element (not illustrated) may be disposed, for example, on the front surface 210A of the housing 210. For example, the light-emitting element (not illustrated) may provide, for example, state information of the electronic device 101 in the form of light. In another embodiment, the light-emitting element (not illustrated) may provide, for example, a light source interworking with the operation of the front camera module 205. The light-emitting element (not illustrated) may include, for example, a light emitting diode (LED), an IR LED, and/or a xenon lamp.

According to an embodiment, the connector holes 208 and 209 may include, for example, a first connector hole 208 capable of accommodating a connector (e.g., a USB connector) configured to transmit and receive power and/or data to and from an external electronic device or a connector (e.g., an earphone jack) configured to transmit and receive audio signals to and from an external electronic device, and/or a second connector hole 209 capable of accommodating a storage device (e.g., a subscriber identification module (SIM) card). According to an embodiment, the first connector hole 208 and/or the second connector hole 209 may be omitted.

Figure 4:
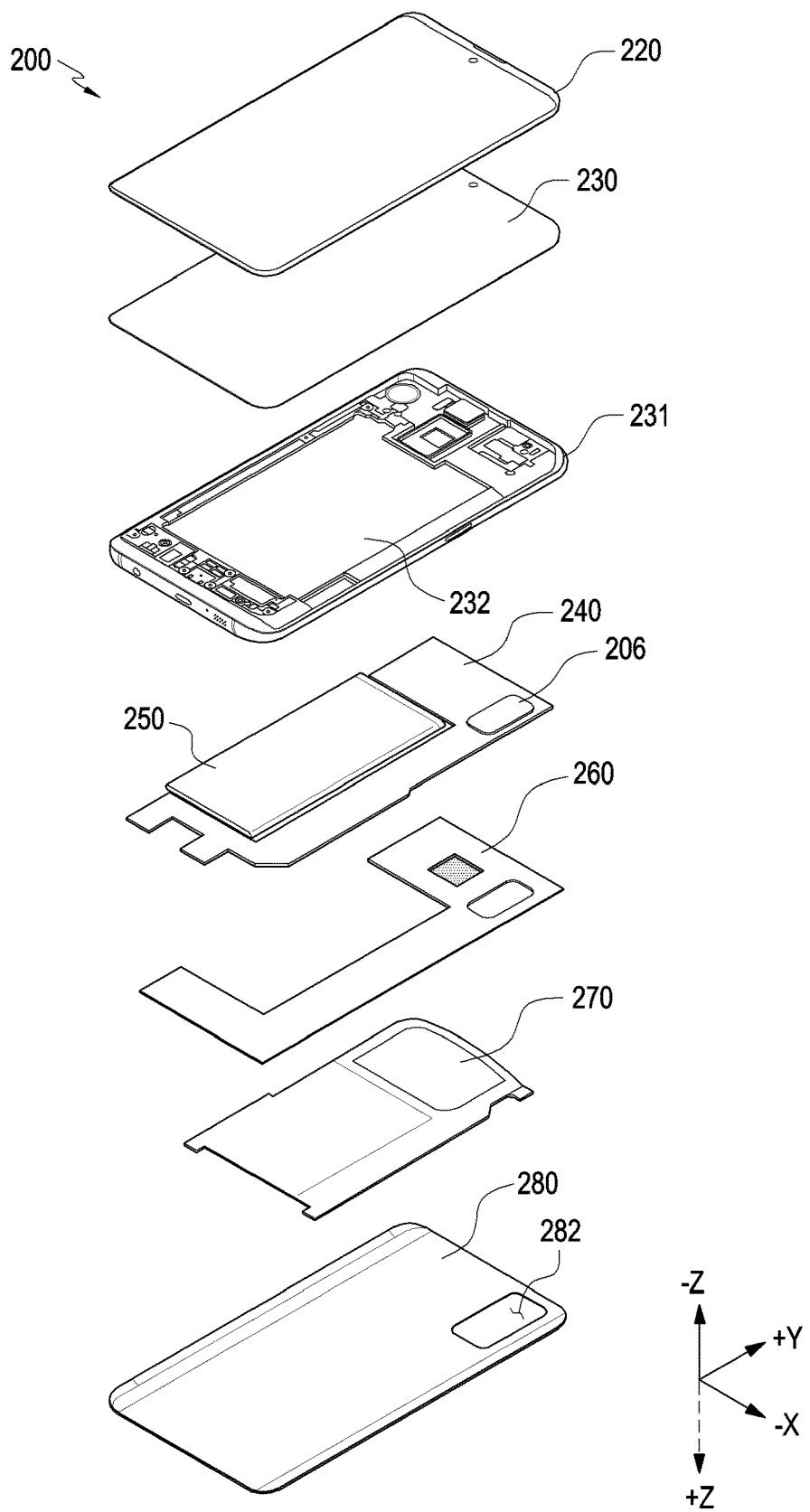
FIG. 4 is an exploded perspective view of an electronic device according to an embodiment of the disclosure.

FIG. 4 is an exploded perspective view of an electronic device according to an embodiment of the disclosure.

Referring to FIG. 4, an electronic device (e.g., the electronic device 200 of FIGS. 2 and 3) may include at least one of a front plate 222 (e.g., the front plate 202 of FIG. 2), a display (e.g., the display 220 of FIG. 2), a first supporting member 232 (e.g., a bracket), a printed circuit board 240, a battery 250, a second supporting member 260 (e.g., a rear case), an antenna 270, and a rear plate 280 (e.g., the rear plate 211 in FIG. 3). In some embodiments, the electronic device 200 may omit at least one (e.g., the first supporting member 232 or the second supporting member 260) of the elements or may additionally include another element. At least one of the elements of the electronic device 200 may be the same as or similar to at least one of the elements of the electronic device 200 of FIG. 2 or 3, and redundant descriptions will be omitted below.

According to various embodiments, the first supporting member 232 may be disposed inside the electronic device 200 to be connected with a side bezel structure 231 or integrated with the side bezel structure 231. The first supporting member 232 may be formed of, e.g., a metal and/or non-metallic material (e.g., polymer). A display 230 may be joined onto one surface of the first supporting member 232, and the printed circuit board 240 may be joined onto the opposite surface of the first supporting member 232. A processor, memory, and/or an interface may be mounted on the printed circuit board 240. The processor may include one or more of, e.g., a central processing unit, an application processor, a graphic processing device, an image signal processing, a sensor hub processor, or a communication processor. According to an embodiment, the memory may include, e.g., a volatile or non-volatile memory. According to an embodiment, the interface may include, e.g., a high-definition multimedia interface (HDMI), a universal serial bus (USB) interface, a secure digital (SD) card interface, and/or an audio interface. The interface may electrically or physically connect, e.g., the electronic device 200 with an external electronic device and may include a USB connector, an SD card/multimedia card (MMC) connector, or an audio connector. According to an embodiment, the battery 250 may be a device for supplying power to at least one component (e.g., a first image sensor of the rear camera module 206) of the electronic device 200, and may include, e.g., a primary cell which is not rechargeable, a secondary cell which is rechargeable, or a fuel cell. At least a portion of the battery 250 may be disposed on substantially the same plane as the printed circuit board 240. The battery 250 may be integrally or detachably disposed inside the electronic device 200.

According to an embodiment, the second supporting member 260 (e.g., a rear case) may be disposed between the printed circuit board 240 and the antenna 270. For example, the second supporting member 260 may include one surface to which at least one of the printed circuit board 240 and the battery 250 is coupled, and another surface to which the antenna 270 is coupled.

According to an embodiment, the antenna 270 may be disposed between the rear plate 280 and the battery 250. The antenna 270 may include, e.g., a near-field communication (NFC) antenna, a wireless charging antenna, and/or a magnetic secure transmission (MST) antenna. The antenna 270 may perform short-range communication with, e.g., an external device or may wirelessly transmit or receive power necessary for charging. For example, the antenna 270 may include a coil for wireless charging. According to another embodiment, an antenna structure may be formed by a portion or combination of the side bezel structure 231 and/or the first supporting member 232.

According to various embodiments, the electronic device 200 may include a camera module (e.g., the rear camera module 206 of FIG. 3) disposed in a housing (e.g., the housing 210 of FIG. 2). According to an embodiment, the rear camera module 206 may be disposed on the first supporting member 232 and may acquire an image of a subject located in the rear (e.g., +Z direction) of the electronic device 200. According to an embodiment, at least a part of the rear camera module 206 may be visually exposed to the outside of the electronic device 200 through an opening 282 disposed on the rear plate 280.

The electronic device 200 illustrated in FIGS. 2 to 4 has a bar-type or plate-type appearance but the disclosure is not limited thereto. For example, the illustrated electronic device may be part of a rollable electronic device and/or a foldable electronic device. The term "rollable electronic device" may refer to an electronic device which includes a display (e.g., the display 220 of FIG. 4) capable of bending deformation such that at least a portion thereof is wound or rolled or accommodated in a housing (e.g., the housing 210 of FIG. 2). According to a user's need, the rollable electronic device may have an expanded screen display region available by unfolding a display or causing a larger area of the display to be exposed to the outside. The "foldable electronic device" may refer to an electronic device in which different two areas of the display may be folded in a direction to face each other or in a direction to face opposite directions from each other. Typically, in a folded state, the different two areas of the display of the foldable electronic device are folded in a direction to face each other or in a direction to face away from each other, and in an actual use state, a user may unfold the display to make the two different areas form a substantially flat plate shape. In some embodiments, the electronic device 200 according to various embodiments disclosed herein may be interpreted to include various electronic devices including a laptop computer or a camera as well as a mobile electronic device such as a smartphone.

Figure 5:
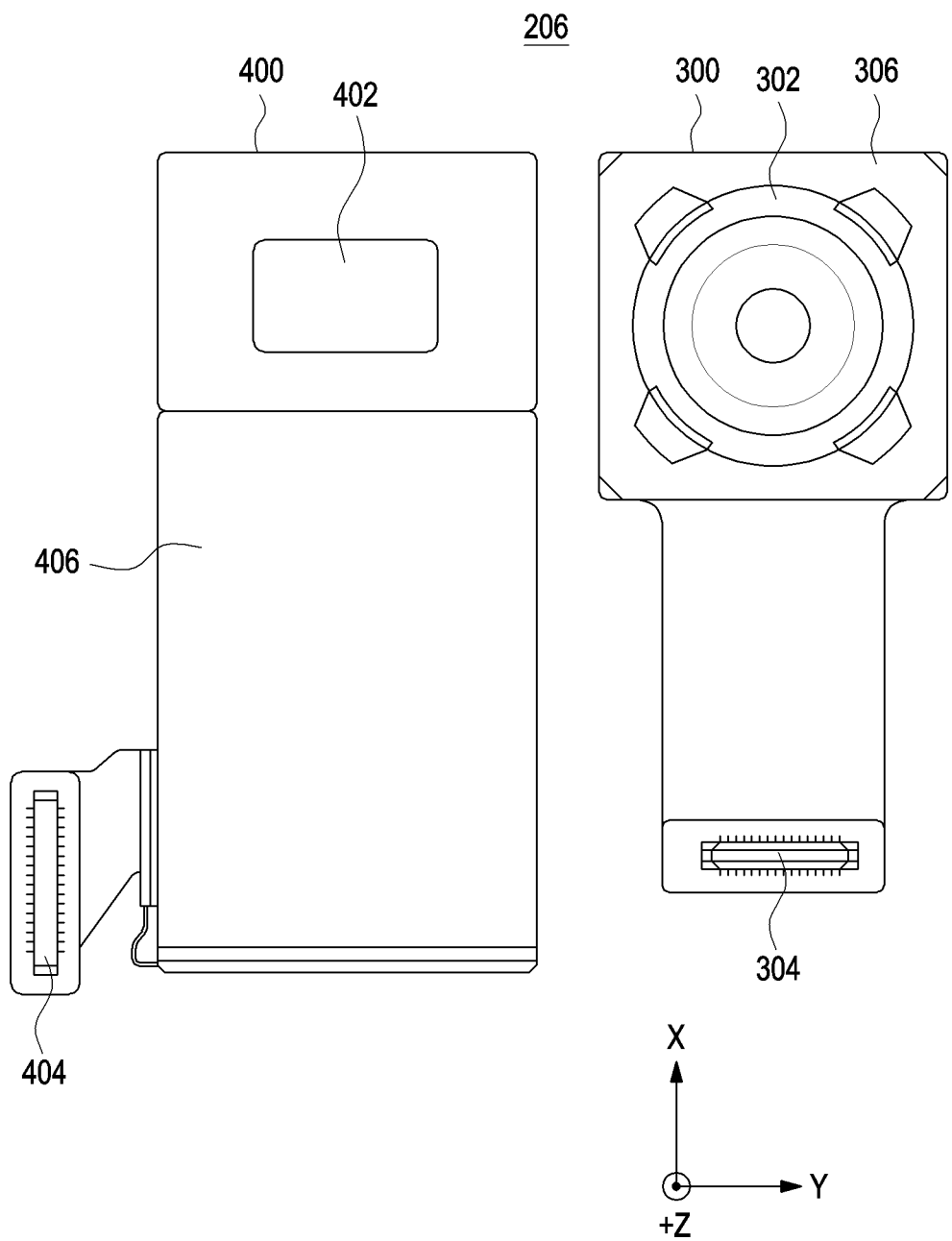
FIG. 5 is a top view of a camera module according to an embodiment of the disclosure.

FIG. 5 is a top view of a camera module according to an embodiment of the disclosure.

Referring to FIG. 5, a camera module (e.g., the rear camera module 206 of FIG. 3) may include a first imaging optical system 300 and a second imaging optical system 400. The configuration of the rear camera module 206 of FIG. 5 may be entirely or partially the same as the configuration of the rear camera module 206 of FIG. 3.

Figure 6:
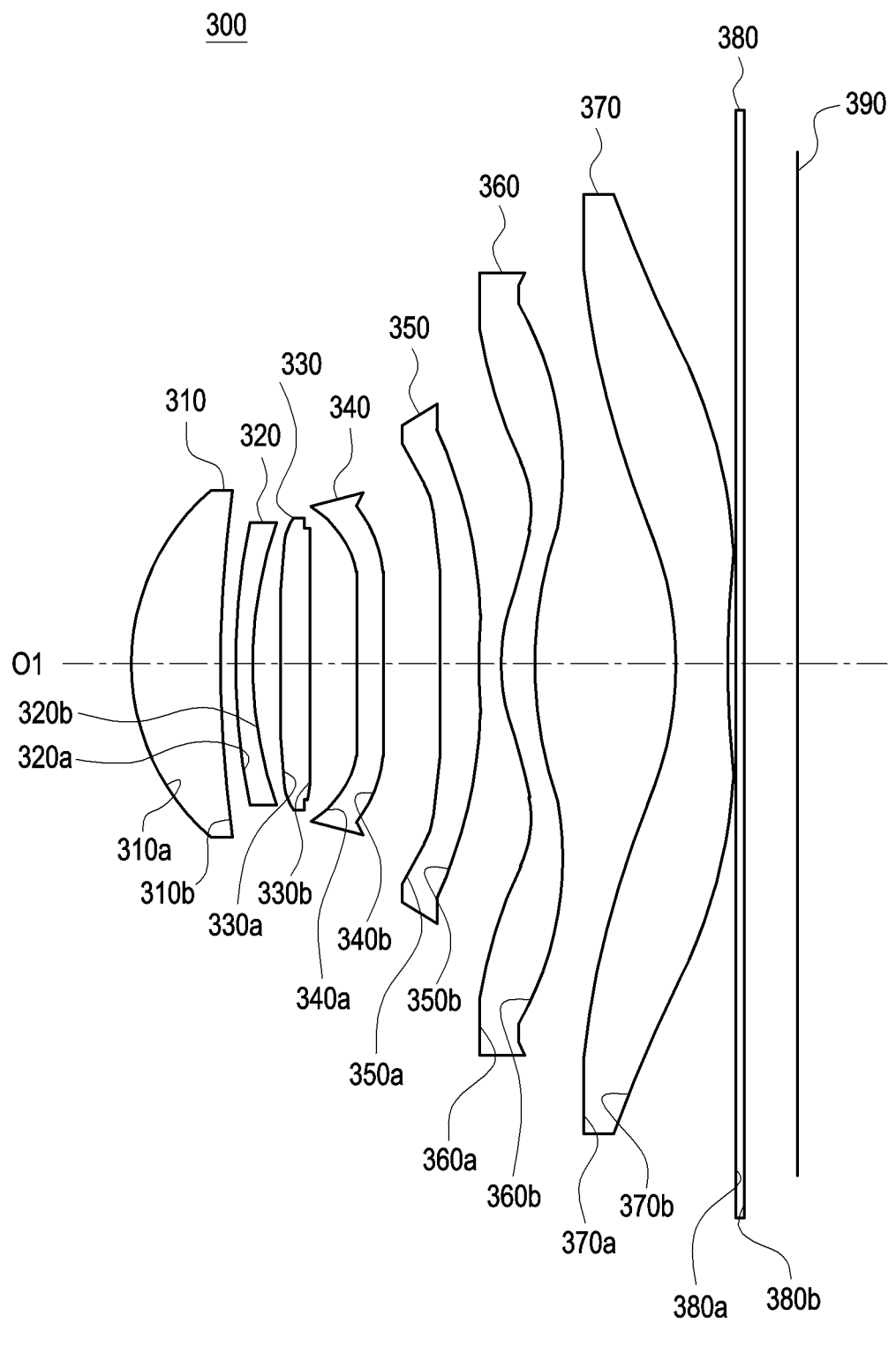
FIG. 6 is a schematic view of a first imaging optical system according to an embodiment of the disclosure.

According to various embodiments, the first imaging optical system 300 may include a first lens assembly 302 including a plurality of lenses (e.g., a plurality of lenses 310, 320, 330, 340, 350, 360, and 370 of FIG. 6) and an image sensor (e.g., first image sensor 390 of FIG. 6), a first camera housing 306 accommodating the first lens assembly 302, and a first connector 304 for electrically connecting the first image sensor 390 to a processor (e.g., the processor 120 of FIG. 1). According to an embodiment, the first imaging optical system 300 may be a wide-angle camera.

Figure 9A:
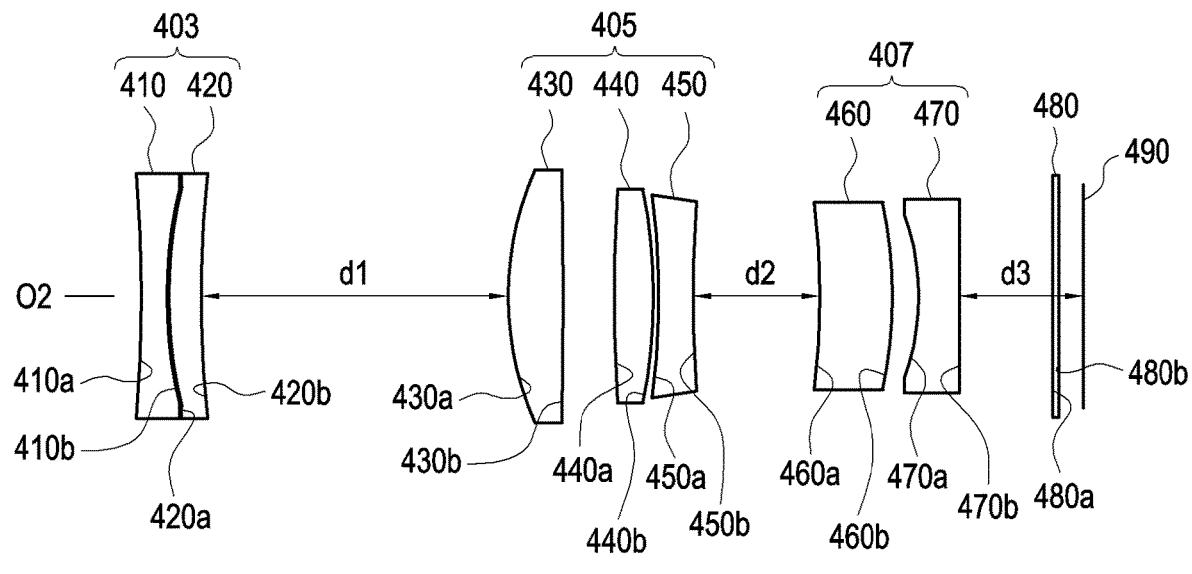
FIGS. 9A and 9B are schematic views illustrating a second imaging optical system, according to various embodiments of the disclosure.
Figure 9B:
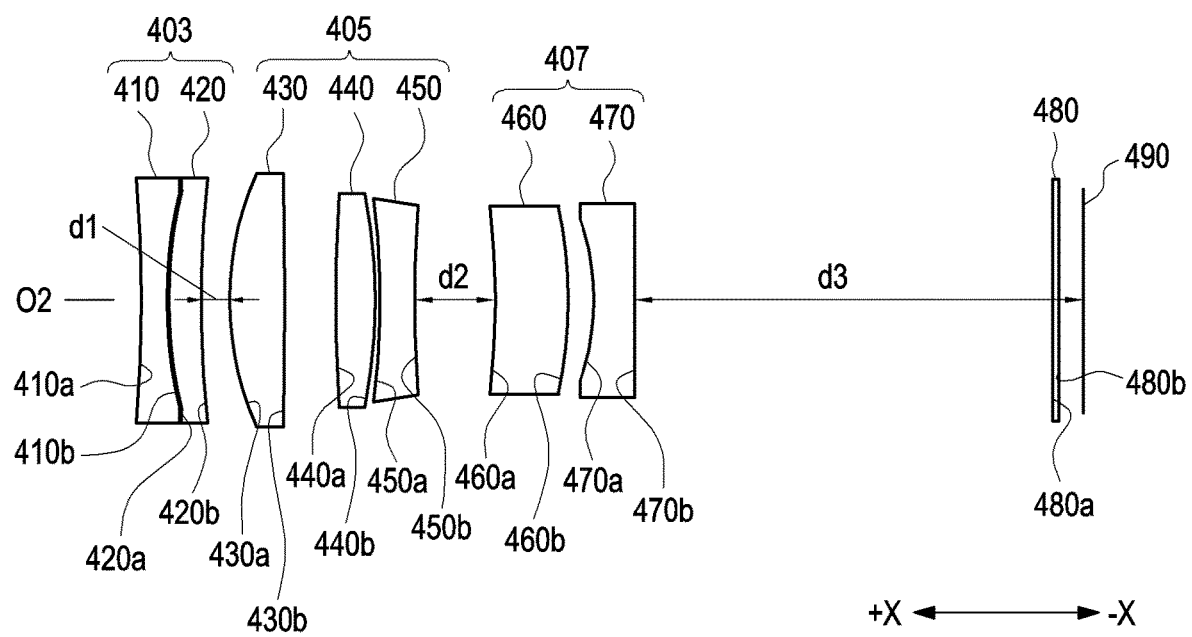

According to various embodiments, the second imaging optical system 400 may include a plurality of lenses (e.g., a plurality of lenses 410, 420, 430, 440, 450, 460, and 470 of FIGS. 9A and 9B), an image sensor (e.g., a second image sensor 490 of FIG. 9A), a second camera housing 406 for accommodating the plurality of lenses 410, 420, 430, 440, 450, 460, and 470 and the second image sensor 490, and a second connector 404 for electrically connecting the second image sensor 490 to a processor (e.g., the processor 120 of FIG. 1).

According to various embodiments, the second imaging optical system 400 may be a prism folded zoom camera. The prism folded zoom structure may be a structure capable of obtaining light by refracting light from the outside of an electronic device (e.g., the electronic device 200 of FIG. 2). For example, in the second imaging optical system 400, the plurality of lenses 410, 420, 430, 440, 450, 460, 470, and the second image sensor 490 are arranged in a direction (e.g., X-axis direction) which is substantially perpendicular to the first direction (+Z direction), and the second image sensor 490 of the second imaging optical system 400 may obtain light reflected through a reflective member (e.g., the reflective member 401 of FIGS. 8A and 8B). According to an embodiment, the second camera housing 406 of the second imaging optical system 400 may be oriented towards a rear side (e.g., a first direction (+Z direction)) of the electronic device 200 and may include a substantially transparent camera window 402. The second image sensor 490 may obtain light passing through the camera window 402 and the plurality of lenses 410, 420, 430, 440, 450, 460, and 470. According to an embodiment, the second imaging optical system 400 may be a telephoto camera. For example, the angle of view of the second imaging optical system 400 may be smaller than or equal to that of the first imaging optical system 300.

According to various embodiments, the electronic device 200 may switch between the image capturing optical systems 300 and 400 based on the zoom magnification or the angle of view range. For example, a processor (e.g., the processor 120 of FIG. 1) of the electronic device 200 may capture an image of a subject (e.g., an object outside of the electronic device 200) using the first imaging optical system 300 within a first angle of view range (e.g., a first zoom magnification range z1 of FIG. 11A), and may capture an image of the subject using the second imaging optical system 400 in a second angle of view range (e.g., a second zoom magnification range z2), which is smaller than the first angle of view range. According to an embodiment, the second imaging optical system 400 may include a plurality of lens groups (e.g., a first lens group 403, a second lens group 405, and a third lens group 407 in FIGS. 8A, 8B, 9A, and 9B), and the electronic device 200 may obtain optically enlarged (e.g., zoomed) images by using the second imaging optical system 400. According to an embodiment, the first imaging optical system 300 and the second imaging optical system 400 may be formed as an integrated module. According to an embodiment, the size of the image sensor (e.g., the first image sensor 390 of FIG. 6) of the first imaging optical system 300 and the size of the image sensor (e.g., the second image sensor 490 of FIG. 8A) of the second imaging optical system 400 may differ.

According to various embodiments, the rear camera module 206 may include an image signal processor (not shown) for processing images obtained by the first imaging optical system 300 and/or the second imaging optical system 400. According to an embodiment, the electronic device (e.g., the electronic device 200 of FIG. 2) may adjust the angle of view of the first imaging optical system 300 and/or the second imaging optical system 400 by using the image signal processor and/or the processor (e.g., the processor 120 of FIG. 1) located on the printed circuit board (e.g., the printed circuit board 240 of FIG. 4).

Figure 7A:
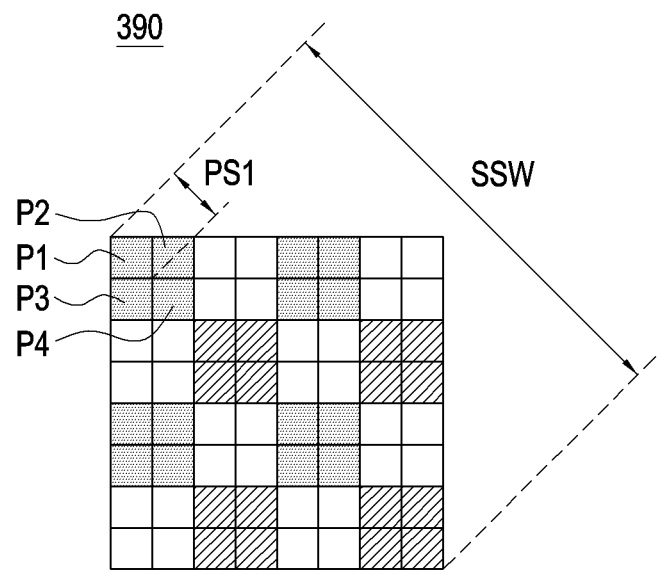
FIGS. 7A and 7B are schematic views of a first image sensor illustrating an operation of an electronic device within a first angle of view range according to various embodiments of the disclosure.
Figure 7B:
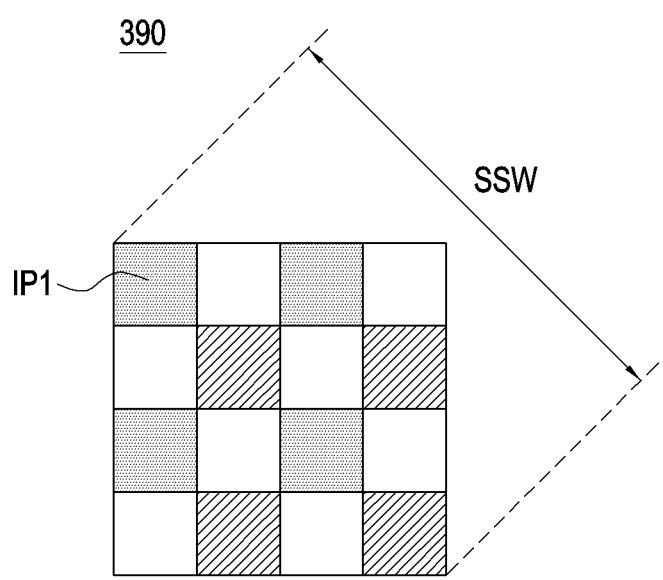

FIG. 6 is a schematic view illustrating a first imaging optical system according to an embodiment of the disclosure. FIGS. 7A and 7B are diagrams illustrating an operation of an electronic device in a first angle of view range, according to various embodiments of the disclosure.

Referring to FIGS. 6, 7A, and 7B, a first imaging optical system 300 may include a plurality of lenses (e.g., a (1-1)th lens 310, a (1-2)th lens 320, a (1-3)th lens 330, a (1-4)th lens 340, a (1-5)th lens 350, a (1-6)th lens 360, and/or a (1-7)th lens 370), and the first image sensor 390. The configuration of the first imaging optical system 300 of FIG. 6 may be entirely or partially the same as the configuration of the first imaging optical system 300 of FIG. 5.

According to various embodiments, the first imaging optical system 300 may include a (1-1)th lens 310, a (1-2)th lens 320, a (1-3)th lens 330, a (1-4)th lens 340, a (1-5)th lens 350, a (1-6)th lens 360, and a (1-7)th lens 370. According to an embodiment, the (1-1)th lens 310, the (1-2)th lens 320, the (1-3)th lens 330, the (1-4)th lens 340, the (1-5)th lens 350, the (1-6)th lens 360, and the (1-7)th lens 370 may be sequentially arranged in a direction from the subject toward the first image sensor 390 along the first optical axis O1. According to an embodiment, the (1-1)th lens 310, the (1-2)th lens 320, the (1-3)th lens 330, the (1-4)th lens 340, the (1-5)th lens 350, the (1-6)th lens 360, and/or the (1-7)th lens 370 may be plastic lenses.

According to various embodiments, the first image sensor 390 may output an image signal using light passing through the plurality of lenses 310, 320, 330, 340, 350, 360, and 370. For example, the first image sensor 390 is a semiconductor that converts light obtained through the plurality of lenses 310, 320, 330, 340, 350, 360, and 370 into a digital signal, and may be a solid image sensor such as a charge coupled device (CCD) or a complementary metal-oxide semiconductor (CMOS).

According to various embodiments, the first imaging optical system 300 may include a first optical filter 380. According to an embodiment, the first optical filter 380 may be disposed between the plurality of lenses 310, 320, 330, 340, 350, 360, and 370 and the first image sensor 390. According to an embodiment, the first optical filter 380 may include at least one of a low pass filter, an infrared-cut filter, or a cover glass. According to an embodiment, the infrared-cut filter may pass a wavelength of a visible band while reducing or blocking a wavelength of an infrared band. For example, when the first optical filter 380 of the first imaging optical system 300 includes an infrared-cut filter, the wavelength of the infrared band transmitted to the first image sensor 390 may be reduced. According to an embodiment, the first optical filter 380 may be excluded from the first imaging optical system 300.

Table 1 below lists at least one of the radius of curvature, thickness or air gap, effective diameter, effective focal length, refractive index, or Abbe number of the (1-1)th lens 310, the (1-2)th lens 320, the (1-3)th lens 330, the (1-4)th lens 340, the (1-5)th lens 350, the (1-6)th lens 360, the (1-7)th lens 370, the first optical filter 380, and the first image sensor 390 of the first imaging optical system 300.

The configurations of the (1-1)th lens 310, the (1-2)th lens 320, the (1-3)th lens 330, the (1-4)th lens 340, the (1-5)th lens 350, the (1-6)th lens 360, the (1-7)th lens 370, the first optical filter 380, and the first image sensor 390 in the first embodiment (e.g., FIG. 6) may satisfy the conditions presented in Table 1, respectively.

According to various embodiments, the F-number, composite effective focal length, and wide-angle of the first imaging optical system 300 may be set in various ways. According to an embodiment (e.g., FIG. 6), the F-number of the first imaging optical system 300 may be 1.90, the effective focal length (EFL) of the first imaging optical system 300 may be 6.65 mm, and the wide-angle of the first imaging optical system 300 may be 81.4 degrees.

TABLE 1

|  | Radius of curvature | Thickness or air gap | effective diameter | effective focal length | refractive index | Abbe number |
| --- | --- | --- | --- | --- | --- | --- |
| 310a | 2.44 | 1.025 | 1.75 | 6.0373 | 1.5441 | 56.11 |
| 310b | 8.087 | 0.1 | 1.71 |  |  |  |
| 320a | 8.002 | 0.19 | 1.55 | −16.9918 | 1.67975 | 18.41 |
| 320b | 4.681 | 0.367 | 1.45 |  |  |  |
| 330a | 20.137 | 0.313 | 1.45 | 633.9869 | 1.56717 | 37.4 |
| 330b | 21.212 | 0.325 | 1.44 |  |  |  |
| 340a | 19.185 | 0.304 | 1.7 | −67.4358 | 1.67073 | 19.23 |
| 340b | 13.386 | 0.644 | 1.56 |  |  |  |
| 350a | 10.943 | 0.488 | 2.21 | −15.4694 | 1.56717 | 37.4 |
| 350b | 4.791 | 0.281 | 2.77 |  |  |  |
| 360a | 1.912 | 0.402 | 3.9 | 5.7168 | 1.5346 | 56.27 |
| 360b | 4.732 | 1.653 | 3.72 |  |  |  |
| 370a | −10.47 | 0.632 | 4.91 | −6.3507 | 1.5441 | 56.11 |
| 370b | 5.267 | 0.11615 | 4.7 |  |  | 56.11 |
| 380a | infinity | 0.11 | 5.56 |  | 1.5168 | 64.2 |
| 380b | infinity |  |  |  |  |  |
| 390 | infinity |  |  |  |  |  |

In Table 1, '310a' and '310b' refer to the front and rear surfaces of the (1-1)th lens 310, respectively, '320a' and '320b' refer to the front and rear surfaces of the (1-2)th lens 320, respectively, '330a' and '330b' refer to the front and rear surfaces of the (1-3)th lens 330, respectively, '340a' and '340b' refer to the front and rear surfaces of the (1-4)th lens 340, respectively, '350a' and '350b' refer to the front and rear surfaces of the (1-5)th lens 350, respectively, '360a' and '360b' refer to the front and rear surfaces of the (1-6)th lens 360, respectively, and '370a' and '370b' refer to the front and rear surfaces of the (1-7)th lens 370, respectively, '380a', and '380b' refer to the front and rear surfaces of the first optical filter 380, respectively, and '390' refers to an image surface of the first image sensor 390. The units for curvature radius, thickness, air gap, and effective diameter in Table 1 may be mm. The front surface may refer to a surface facing a first direction (e.g., +Z direction) toward the outside of the first imaging optical system 300, and the rear surface may refer to a surface facing a fourth direction (e.g., −Z direction) opposite to the first direction. According to various embodiments, the first imaging optical system 300 may include at least one aspheric lens. For example, at least one of the (1-1)th lens 310, the (1-2)th lens 320, the (1-3)th lens 330, the (1-4)th lens 340, the (1-5)th lens 350, the (1-6)th lens 360, or the (1-7)th lens 370 may have at least one surface formed in an aspherical shape.

The shape of the aspheric lens can be calculated through Equation 1 below.

$$Z = \frac{cY^2}{1+\sqrt{1-(1+K)c^2Y^2}} +$$
$$AY^4 + BY^6 + CY^8 + DY^{10} + EY^{12} + FY^{12} + \ldots$$

Equation 1

In Equation 1, 'z' may denote a distance in the optical axis direction from the vertex of the lens, 'Y' may denote a distance in a direction perpendicular to the optical axis of the lens, 'c' may denote the reciprocal (=1/R) of a radius of curvature at the vertex of the lens, 'K' may denote a conic constant, and 'A', 'B', 'C', 'D', 'E', and 'F' each may denote aspherical coefficients.

Table 2 below lists aspherical coefficients for each of the (1-1)th to (1-7)th lenses 310, 320, 330, 340, 350, 360, and 370. The (1-1)th to (1-7)th lenses 310, 320, 330, 340, 350, 360, and 370 in the first imaging optical system 300 of the first embodiment (e.g., FIG. 6) may satisfy the conditions of Table 2 below.

rear surfaces of the (1-3)th lens 330, respectively, '340a' and '340b' refer to the front and rear surfaces of the (1-4)th lens 340, respectively, '350a' and '350b' refer to the front and rear surfaces of the (1-5)th lens 350, respectively, '360a' and '360b' refer to the front and rear surfaces of the (1-6)th lens 360, respectively, and '370a' and '370b' refer to the front and rear surfaces of the (1-7)th lens 370, respectively. According to various embodiments, the first imaging optical system 300 may include an aperture (not shown). According to an embodiment, the amount of light reaching the first image sensor 390 may be modulated by adjusting the size of the aperture. According to an embodiment, the aperture may be positioned between the (1-2)th lens 320 and the (1-3)th lens 330. For example, the aperture may be located on the rear surface 320b of the (1-2)th lens 320.

According to various embodiments, the electronic device (e.g., the electronic device 200 of FIG. 2) may capture objects outside of the electronic device using the first imaging optical system 300 within a first zoom magnification range (e.g., 1 to 3 times). According to an embodiment, the processor (e.g., the processor 120 of FIG. 1) of the electronic device 200 may adjust the size of the image obtained from the first imaging optical system 300 using digital zoom or crop. For example, the processor 120 may adjust the size of the image by cropping a portion of the image obtained by the first image sensor 390 and then enlarging the portion of the image. According to an embodiment, the processor 120 may improve the image quality of the enlarged image by merging or separating pixels of the first image sensor 390. For example, the first image sensor 390 may obtain light using its pixels (e.g., a first pixel P1,

TABLE 2

| | K | A | B | C | D |
|---|---|---|---|---|---|
| 310a | −8.2771 · E−01 | 4.3519 · E−03 | 9.6902 · E−03 | −1.5646 · E−02 | 1.6485 · E−02 |
| 310b | 1.4920 · E+01 | −3.6194 · E−02 | 1.4147 · E−02 | 3.0707 · E−02 | −4.9501 · E−02 |
| 320a | 1.9167 · E+01 | −7.9052 · E−02 | 1.5514 · E−01 | −2.3604 · E−01 | 2.7147 · E−01 |
| 320b | 4.2998 · E+00 | −2.7061 · E−02 | 3.5298 · E−02 | −7.9435 · E−02 | 2.1280 · E−01 |
| 330a | 8.5021 · E+01 | 1.9614 · E−02 | −2.1770 · E−01 | 5.8533 · E−01 | −8.8886 · E−01 |
| 330b | 6.8359 · E+01 | −3.7957 · E−02 | 2.2984 · E−02 | −9.7364 · E−03 | 5.9655 · E−04 |
| 340a | −1.8422 · E+02 | −9.2554 · E−02 | 1.0704 · E−01 | −1.3879 · E−01 | 9.3205 · E−02 |
| 340b | −9.4110 · E−02 | −8.4240 · E−02 | 9.1554 · E−02 | −1.0415 · E−01 | 6.3156 · E−02 |
| 350a | 1.6021 · E+01 | −7.4707 · E−02 | 5.5057 · E−02 | −2.8166 · E−02 | 6.5690 · E−03 |
| 350b | −8.8584 · E+01 | −1.0726 · E−01 | 6.2331 · E−02 | −2.5543 · E−02 | 6.7549 · E−03 |
| 360a | −7.5668 · E+00 | −7.7823 · E−03 | 5.8076 · E−03 | −5.4674 · E−03 | 1.5471 · E−03 |
| 360b | −1.0740 · E+01 | 2.2100 · E−02 | −1.3293 · E−02 | 3.5986 · E−03 | −6.5205 · E−04 |
| 370a | −1.2720 · E+01 | −7.3775 · E−02 | 2.3044 · E−02 | −3.3021 · E−03 | 2.5000 · E−04 |
| 370b | −3.1139 · E+01 | −2.5762 · E−02 | 1.6355 · E−03 | 6.5116 · E−04 | −1.6492 · E−04 |

| | E | F | G | H | J |
|---|---|---|---|---|---|
| 310a | −1.0292 · E−02 | 3.8736 · E−03 | −8.6208 · E−04 | 1.0436 · E−04 | −5.3403 · E−06 |
| 310b | 3.3900 · E−02 | −1.3146 · E−02 | 3.0108 · E−03 | −3.8807 · E−04 | 2.2377 · E−05 |
| 320a | −2.0976 · E−01 | 1.0317 · E−01 | −3.0824 · E−02 | 5.0909 · E−03 | −3.5652 · E−04 |
| 320b | −3.1229 · E−01 | 2.5495 · E−01 | −1.1763 · E−01 | 2.8827 · E−02 | −2.9203 · E−03 |
| 330a | 8.4210 · E−01 | −5.0435 · E−01 | 1.8574 · E−01 | −3.8376 · E−02 | 3.4063 · E−03 |
| 330b | 4.2953 · E−03 | −2.0720 · E−03 | 2.9703 · E−04 | 1.3631 · E−17 | 5.0094 · E−19 |
| 340a | −3.1623 · E−02 | 4.1145 · E−03 | −1.5575 · E−16 | −6.5532 · E−18 | 7.9544 · E−20 |
| 340b | −2.0392 · E−02 | 3.0686 · E−03 | −1.3478 · E−04 | 1.1677 · E−19 | 4.8325 · E−21 |
| 350a | 4.1544 · E−04 | −5.8288 · E−04 | 1.2552 · E−04 | −1.1368 · E−05 | 3.7984 · E−07 |
| 350b | −1.0416 · E−03 | 8.3931 · E−05 | −2.7129 · E−06 | 1.1282 · E−12 | −9.6173 · E−12 |
| 360a | −2.1975 · E−04 | 1.8009 · E−05 | −8.7074 · E−07 | 2.3260 · E−08 | −2.6678 · E−10 |
| 360b | 7.8411 · E−05 | −5.9975 · E−06 | 2.7659 · E−07 | −6.9609 · E−09 | 7.3153 · E−11 |
| 370a | −8.6695 · E−06 | −4.6559 · E−08 | 1.4437 · E−08 | −4.4805 · E−10 | 4.6278 · E−12 |
| 370b | 1.7335 · E−05 | −9.9539 · E−07 | 3.2500 · E−08 | 5.6697 · E−10 | 4.1078 · E−12 |

In Table 2, '310a' and '310b' refer to the front and rear surfaces of the (1-1)th lens 310, respectively, '320a' and '320b' refer to the front and rear surfaces of the (1-2)th lens 320, respectively, '330a' and '330b' refer to the front and a second pixel P2, a third pixel P3, and a fourth pixel P4) at a first zoom magnification (e.g., 1×), and may obtain light using a first composite pixel IP1 formed by merging the first pixel P1, the second pixel P2, the third pixel P3, and the fourth pixel P4 at a second zoom magnification (e.g., 3×) higher than the first zoom magnification. Referring to FIGS. 7A and 7B, it has been described that one composite pixel (e.g., the first composite pixel IP1) is divided into four pixels (e.g., the first pixel P1, the second pixel P2, the third pixel P3, and the fourth pixel P4), but this is merely an example. For instance, the first composite pixel IP1 may be split into nine pixels. According to an embodiment, an operation of merging or separating pixels of the first image sensor 390 may be interpreted as binning (e.g., tetra-binning, nona-binning) or re-mosaic. For example, binning may refer to a process of grouping a plurality of pixels into a single pixel for use, and may include a process of rearranging a Bayer pattern into a tetra or nona pattern. The re-mosaic may encompass a process of rearranging a tetra or nona pattern into a Bayer pattern. According to an embodiment, the electronic device 200 may amplify the intensity of light obtained by the first image sensor 390 by merging pixels and enhance the quality of an image even in a low-light environment by using the binning operation. According to an embodiment, the electronic device 200 may improve the quality of an image by rearranging color pixels (e.g., the first pixel P1, the second pixel P2, the third pixel P3, and/or the fourth pixel P4) using the remosaic operation, when the outside of the electronic device 200 is bright. The size SSW (e.g., diagonal length) of the first image sensor 390 according to an embodiment may be approximately 12 mm. A sensor pixel size psi of the first image sensor 390 according to an embodiment may be approximately 0.0008 mm.

Figure 8A:
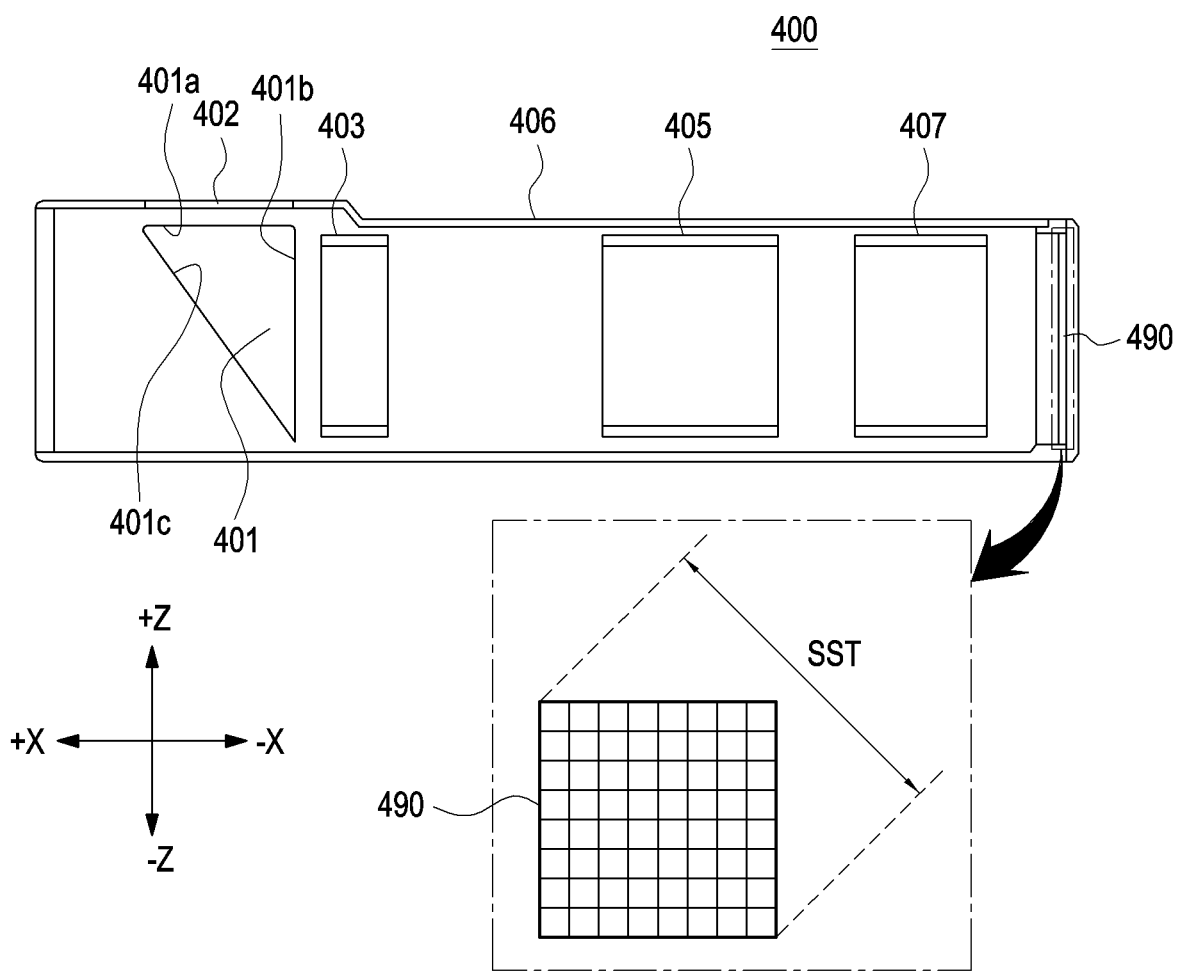
FIG. 8A is a cross-sectional view of a second imaging optical system in a first state according to an embodiment of the disclosure.
Figure 8B:
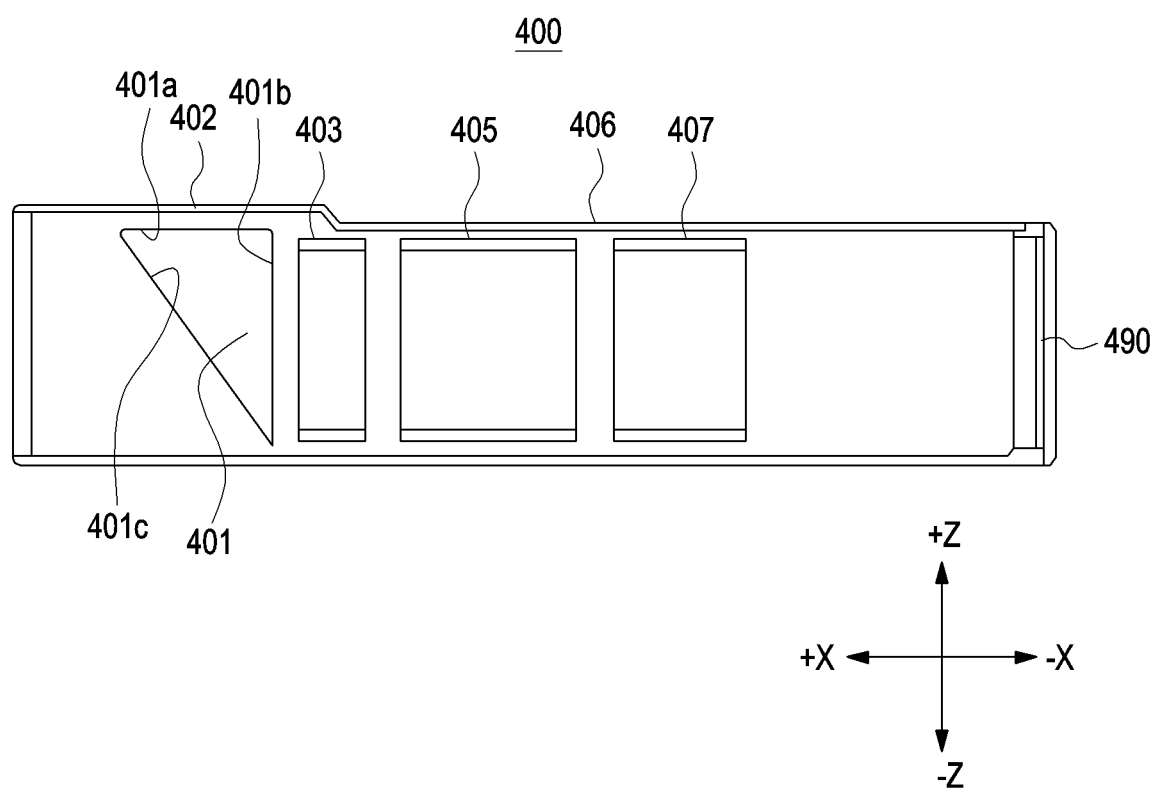
FIG. 8B is a cross-sectional view of a second imaging optical system in a second state according to an embodiment of the disclosure.

FIG. 8A is a cross-sectional view of a second imaging optical system in a first state, according to an embodiment of the disclosure, and FIG. 8B is a cross-sectional view of a second imaging optical system in a second state, according to an embodiment of the disclosure. FIGS. 9A and 9B are schematic views illustrating a second imaging optical system according to various embodiments of the disclosure.

Referring to FIGS. 8A, 8B, 9A, and 9B, a second imaging optical system 400 may include a reflective member 401, a plurality of lenses (e.g., a (2-1)th lens 410, a (2-2)th lens 420, a (2-3)th lens 430, a (2-4)th lens 440, a (2-5)th lens 450, a (2-6)th lens 460, and/or a (2-7)th lens 470), a second image sensor 490, and a second camera housing 406 capable of accommodating the reflective member 401, the plurality of lenses 410, 420, 430, 440, 450, 460, and 470, and/or the second image sensor 490. The configuration of the second imaging optical system 400 in FIGS. 8A, 8B, 9A, and 9B may be entirely or partially the same as the configuration of the second imaging optical system 400 in FIG. 5.

According to various embodiments, the reflective member 401 may refract light. According to an embodiment, the reflective member 401 may refract at least a portion of light transmitted to the camera window 402 of the second imaging optical system 400 in the fourth direction (−Z direction) from the outside of the electronic device (e.g., the electronic device 200 of FIG. 2) in the third direction (e.g., −X direction) toward the second image sensor 490. For example, the reflective member 401 may include a first reflective member surface 401a facing a first direction (+Z direction), a second reflective member surface 401b facing the first lens group 403 and/or the second image sensor 490, and a third reflective member surface 401c extending from the first reflective member surface 401a to the second reflective member surface 401b. At least a portion of the light incident on the first reflective member surface 401a may be reflected from the third reflective member surface 401c and transmitted to the second reflective member surface 401b. According to an embodiment, the reflective member 401 may have a prism structure.

According to various embodiments, the first lens group 403 may include at least one lens. For example, the first lens group 403 may include the (2-1)th lens 410 and the (2-2)th lens 420. According to an embodiment, the (2-1)th lens 410 and the (2-2)th lens 420 may be sequentially arranged along a second optical axis O2, in a direction from the reflective member 401 toward the second image sensor 490 and/or the second lens group 405. According to an embodiment, the first lens group 403 may be fixed to the second camera housing 406.

According to various embodiments, the second lens group 405 may include at least one lens. For example, the second lens group 405 may include the (2-3)th lens 430, the (2-4)th lens 440, and the (2-5)th lens 450. According to an embodiment, the (2-3)th lens 430, the (2-4)th lens 440, and the (2-5)th lens 450 may be sequentially arranged along the second optical axis O2, in a direction from the first lens group 403 toward the second image sensor 490 and/or the third lens group 407.

According to various embodiments, the second lens group 405 may have a positive (+) composite refractive power. For example, the sum of the refractive powers of the (2-3)th lens 430, the (2-4)th lens 440, and the (2-5)th lens 450 may be positive (+), and the second lens group 405 may focus at least some of the light incident on it.

According to various embodiments, the third lens group 407 may include at least one lens. For example, the third lens group 407 may include the (2-6)th lens 460 and the (2-7)th lens 470. According to an embodiment, the (2-6)th lens 460 and the (2-7)th lens 470 may be sequentially arranged along the second optical axis O2, in a direction from the second lens group 405 toward the second image sensor 490.

According to various embodiments, the third lens group 407 may have a negative (−) composite refractive power. For example, the sum of the refractive powers of the (2-6)th lens 460 and the (2-7)th lens 470 may be negative (−), and the third lens group 407 may scatter at least some of light incident on it.

According to various embodiments, the electronic device (e.g., the electronic device 200 of FIG. 2) may implement an auto focusing (AF) function using the third lens group 407. According to an embodiment, the third lens group 407 may perform focus adjustment based on the distance between the subject and the second imaging optical system 400. For example, the second imaging optical system 400 may include an actuator (not shown) connected to the third lens group 407, and the actuator may change the position of the third lens group 407.

According to various embodiments, the electronic device (e.g., the electronic device 200 of FIG. 2) may implement an optical image stabilization (OIS) function for image stabilization using the second lens group 405 and/or the third lens group 407. For instance, the second imaging optical system 400 may include an actuator (not shown) connected to the second lens group 405 and/or the third lens group 407, and the actuator may correct the shaking of the electronic device 200 by moving the second lens group 405 and/or the third lens group 407 based on information (e.g., the inclination of the electronic device 200) obtained from a gyro sensor (e.g., the sensor module 176 of FIG. 1).

According to various embodiments, the second imaging optical system 400 may include a second optical filter 480. According to an embodiment, the second optical filter 480 may be disposed between the plurality of lenses 410, 420, 430, 440, 450, 460, and 470 and the second image sensor

490. According to an embodiment, the second optical filter 480 may include at least one of a low pass filter, an infrared-cut filter (IR-cut filter), or a cover glass. According to an embodiment, the infrared-cut filter may pass a wavelength of a visible band while reducing or blocking a wavelength of an infrared band. For example, when the second optical filter 480 of the second imaging optical system 400 includes an infrared-cut filter, the wavelength of the infrared band transmitted to the second image sensor 490 may be reduced. According to an embodiment, the second optical filter 480 may be excluded from the second imaging optical system 400.

According to various embodiments, the second image sensor 490 may output an image signal using light passing through the first lens group 403, the second lens group 405, and the third lens group 407. For example, the second image sensor 490 is a semiconductor that converts light obtained through the first lens group 403, the second lens group 405, and the third lens group 407 into a digital signal, and may be a solid image sensor such as a charge coupled device (CCD) or a complementary metal-oxide semiconductor (CMOS).

According to various embodiments, the size SST of the second image sensor 490 of the second imaging optical system 400 may be smaller than the size of the first image sensor (e.g., the first image sensor 390 of FIG. 7A) of the first imaging optical system (e.g., the first imaging optical system 300 of FIG. 6). For example, the electronic device (e.g., the electronic device 200 of FIG. 2) may satisfy Conditional Expression 1.

$$\left(\frac{SSW}{SST}\right) > 2 \quad \text{Conditional Expression 1}$$

wherein SSW denotes the size of the first image sensor and SST denotes the size of the second image sensor.

According to an embodiment (e.g., FIG. 8A or 8B), the size SST (e.g., diagonal length) of the second image sensor 490 may be approximately 5.1 mm. In the electronic device 200 according to an embodiment (e.g., FIGS. 6 and 8A), the size SSW of the first image sensor 390 with respect to the size SST of the second image sensor 490 may be approximately 2.35.

According to an embodiment, in the case of $$\frac{SSW}{SST} \leq 2,$$

a portion of the angle of view of the second imaging optical system 400 is smaller than that of the first imaging optical system 300. Consequently, when the imaging optical systems 300 and 400 used by the electronic device 200 switch from the first imaging optical system 300 to the second imaging optical system 400, the image quality may decrease.

Table 3 below lists at least one of the radius of curvature, thickness or air gap, effective focal length, refractive index, or Abbe number of the (2-1)th lens 410, the (2-2)th lens 420, the (2-3)th lens 430, the (2-4)th lens 440, the (2-5)th lens 450, the (2-6)th lens 460, the (2-7)th lens 470, the second optical filter 480, and the second image sensor 490 of the second imaging optical system 400.

According to an embodiment, the configurations of the (2-1)th lens 410, the (2-2)th lens 420, the (2-3)th lens 430, the (2-4)th lens 440, the (2-5)th lens 450, the (2-6)th lens 460, the (2-7)th lens 470, the second optical filter 480, and the second image sensor 490 may satisfy the conditions presented in Table 3, respectively.

TABLE 3

| | radius of curvature | thickness or air gap | effective focal length | refractive index | Abbe number |
|---|---|---|---|---|---|
| 410a | −34.833 | 0.70 | −13.2 | 1.544 | 56.09 |
| 410b | 9.116 | 0.13 | | | |
| 420a | 9.958 | 0.96 | 37.1 | 1.650 | 21.52 |
| 420b | 16.313 | 10.33 | | | |
| 430a | 5.175 | 1.57 | 10.4 | 1.497 | 81.56 |
| 430b | −1246.455 | 0.91 | | | |
| 440a | 36.709 | 1.40 | 9.7 | 1.544 | 56.09 |
| 440b | −6.102 | 0.10 | | | |
| 450a | −5.626 | 0.92 | −12.9 | 1.614 | 25.94 |
| 450b | −20.449 | 4.35 | | | |
| 460a | −13.722 | 2.12 | 28.9 | 1.671 | 19.23 |
| 460b | −8.532 | 0.75 | | | |
| 470a | −6.397 | 0.77 | −9.8 | 1.535 | 55.71 |
| 470b | 29.641 | 2.28 | | | |
| 480a | infinity | 0.11 | | 1.517 | 64.2 |
| 480b | infinity | 0.61 | | | |
| 490 | infinity | — | | | |

In Table 3, '410*a*' and '410*b*' refer to the front and rear surfaces of the (2-1)th lens 410, respectively, '420*a*' and '420*b*' refer to the front and rear surfaces of the (2-2)th lens 420, respectively, '430*a*' and '430*b*' refer to the front and rear surfaces of the (2-3)th lens 430, respectively, '440*a*' and '440*b*' refer to the front and rear surfaces of the (2-4)th lens 440, respectively, '450*a*' and '450*b*' refer to the front and rear surfaces of the (2-5)th lens 450, respectively, '460*a*' and '460*b*' refer to the front and rear surfaces of the (2-6)th lens 460, respectively, and '470*a*' and '470*b*' refer to the front and rear surfaces of the (2-7)th lens 470, respectively, '480*a*', and '480*b*' refer to the front and rear surfaces of the second optical filter 480, respectively, and '490' refers to the image surface of the second image sensor 490. The units of curvature radius, thickness, and air gap in Table 3 may be mm. The front surface may refer to a surface facing a second direction (e.g., the +X direction) toward the outside of the second imaging optical system 400, and the rear surface may refer to a surface facing a third direction (e.g., the −X direction) opposite to the second direction. According to various embodiments, the second imaging optical system 400 may include at least one aspheric lens. For example, at least one of the (2-1)th lens 410, the (2-2)th lens 420, the (2-3)th lens 430, the (2-4)th lens 440, the (2-5)th lens 450, the (2-6)th lens 460, or the (2-7)th lens 470 may have at least one surface formed in an aspheric shape.

Table 4 below lists aspherical coefficients for each of the (2-1)th to (2-7)th lenses 410, 420, 430, 440, 450, 460, and 470. The (2-1)th to (2-7)th lenses 410, 420, 430, 440, 450, 460, and 470 in the second imaging optical system 400 of the second embodiment (e.g., FIG. 8A or 8B) may satisfy the conditions presented in Table 4 below.

TABLE 4

|  | K | A | B | C | D | E | F | G | H | J |
|---|---|---|---|---|---|---|---|---|---|---|
| 410a | 19.2517 | −4.6149E−05 | −2.9809E−05 | −2.7225E−06 | 3.3386E−07 | −5.9377E−09 | 0.0000E+00 | 0.0000E+00 | 0.0000E+00 | 0.0000E+00 |
| 410b | −0.0804 | 2.0424E−04 | −5.8526E−05 | −2.2875E−06 | −1.0685E−07 | 2.4044E−08 | 0.0000E+00 | 0.0000E+00 | 0.0000E+00 | 0.0000E+00 |
| 420a | 0.0000 | −7.9623E−04 | −3.3258E−05 | 1.1677E−07 | 2.9500E−07 | −2.2217E−08 | 0.0000E+00 | 0.0000E+00 | 0.0000E+00 | 0.0000E+00 |
| 420b | −1.6252 | −1.0326E−03 | −2.4906E−05 | 2.9433E−06 | 3.3147E−07 | −3.3229E−08 | 0.0000E+00 | 0.0000E+00 | 0.0000E+00 | 0.0000E+00 |
| 430a | −0.1074 | −5.7781E−04 | −1.8912E−05 | −2.4642E−06 | −6.2311E−08 | 0.0000E+00 | 0.0000E+00 | 0.0000E+00 | 0.0000E+00 | 0.0000E+00 |
| 430b | −50.0000 | −6.7839E−04 | 6.1743E−06 | 2.8280E−06 | 1.1801E−07 | −1.3083E−09 | 0.0000E+00 | 0.0000E+00 | 0.0000E+00 | 0.0000E+00 |
| 440a | −28.6820 | −8.2458E−04 | −3.6518E−05 | 1.0984E−06 | 2.3700E−06 | −1.1037E−07 | 0.0000E+00 | 0.0000E+00 | 0.0000E+00 | 0.0000E+00 |
| 440b | −5.3699 | 6.8595E−05 | −1.0957E−04 | 5.9769E−07 | 1.9875E−06 | −1.0934E−07 | 0.0000E+00 | 0.0000E+00 | 0.0000E+00 | 0.0000E+00 |
| 450a | −6.8161 | 1.6021E−03 | 6.5499E−05 | −3.4961E−06 | 2.4901E−07 | 4.2012E−08 | 0.0000E+00 | 0.0000E+00 | 0.0000E+00 | 0.0000E+00 |
| 450b | −91.3129 | 2.8437E−03 | 1.0628E−04 | 1.8141E−05 | −4.5325E−06 | 5.5797E−07 | −1.5395E−08 | 0.0000E+00 | 0.0000E+00 | 0.0000E+00 |
| 460a | −29.5639 | 2.3288E−03 | −2.7689E−03 | 3.5959E−03 | −2.6047E−03 | 1.1574E−03 | −3.2283E−04 | 5.5152E−05 | −5.2800E−06 | 2.1701E−07 |
| 460b | −19.9912 | 3.0801E−03 | −9.5188E−03 | 1.2349E−02 | −9.0254E−03 | 4.0915E−03 | −1.1748E−03 | 2.0794E−04 | −2.0667E−05 | 8.7961E−07 |
| 470a | −79.5637 | −3.4350E−02 | 6.4698E−03 | 9.4773E−03 | −1.1397E−02 | 6.0857E−03 | −1.8680E−03 | 3.3853E−04 | −3.3588E−05 | 1.3978E−06 |
| 470b | 60.3999 | −3.5124E−03 | −1.0250E−02 | 1.4759E−02 | −1.1045E−02 | 4.9641E−03 | −1.3754E−03 | 2.3012E−04 | −2.1293E−05 | 8.3466E−07 |

In Table 4, '410a' and '410b' refer to the front and rear surfaces of the (2-1)th lens 410, respectively, '420a' and '420b' refer to the front and rear surfaces of the (2-2)th lens 420, respectively, '430a' and '430b' refer to the front and rear surfaces of the (2-3)th lens 430, respectively, '440a' and '440b' refer to the front and rear surfaces of the (2-4)th lens 440, respectively, '450a' and '450b' refer to the front and rear surfaces of the (2-5)th lens 450, respectively, '460a' and '460b' refer to the front and rear surfaces of the (2-6)th lens 460, respectively, and '470a' and '470b' refer to the front and rear surfaces of the (2-7)th lens 470, respectively. According to various embodiments, an electronic device (e.g., the electronic device 200 of FIG. 2) may move at least one among a plurality of lens groups (e.g., the first lens group 403, the second lens group 405, and the third lens group 407). According to an embodiment, the second lens group 405 and the third lens group 407 may slide. According to an embodiment, at least one of the second lens group 405 or the third lens group 407 may slide relative to the first lens group 403 or the second image sensor 490. For instance, at least one of a first distance d1 between the first lens group 403 and the second lens group 405, a second distance d2 between the second lens group 405 and the third lens group 407, or a third distance d3 between the third lens group 407 and the second image sensor 490 may be changed. According to an embodiment (e.g., FIGS. 8A and 9A), the first distance d1 may be interpreted as a distance between the rear surface 420b of the (2-2)th lens 420 and the front surface 430a of the (2-3)th lens 430 on the second optical axis O2, the second distance d2 may be interpreted as a distance between the rear surface 450b of the (2-5)th lens 450 and the front surface 460a of the (2-6)th lens 460 on the second optical axis O2, and the third distance d3 may be interpreted as a distance between the rear surface 470b of the (2-7)th lens 470 and the second image sensor 490 on the second optical axis O2.

Table 5 below lists the first distance d1 between the first lens group 403 and the second lens group 405, the second distance d2 between the second lens group 405 and the third lens group 407, and the third distance d3 between the third lens group 407 and the second image sensor 490, all of which are varied based on the angle of view of the second imaging optical system 400.

According to various embodiments, changing the distance between the second lens group 405 and the second image sensor 490 and/or the distance between the third lens group 407 and the second image sensor, may alter the angle of view of the second imaging optical system 400. For example, an angle of view when the second lens group 405 and/or the third lens group 407 is adjacent to the first lens group 403 (e.g., as seen in FIG. 8B or 9B) may be smaller than an angle of view when the second lens group 405 and/or the third lens group 407 is adjacent to the second image sensor 490 (e.g., as seen in FIG. 8A or 9A).

According to an embodiment, when zooming in, the second lens group 405 may move in a second direction (+X direction) toward the first lens group 403, and when zooming out, the second lens group 405 may move in a third direction (−X direction) toward the second image sensor 490. The second direction (+X direction) may be substantially perpendicular to a first direction (+Z direction) that a first image sensor (e.g., the first image sensor 390 of FIGS. 7A and 7B) of a first imaging optical system (e.g., the first imaging optical system 300 of FIG. 6) faces.

According to an embodiment, in a first state (e.g., FIGS. 8A and 9A) where the second imaging optical system 400 captures a subject at a first zoom magnification (e.g., three times), the first distance d1 may be approximately 10.34 mm, the second distance d2 may be approximately 4.35 mm, and the third distance d3 may be approximately 2.28 mm. According to an embodiment, in a second state (e.g., FIGS. 8B and 9B) where the second imaging optical system 400 captures a subject at a second zoom magnification (e.g., ten times) greater than the first zoom magnification, the first distance d1 may be approximately 0.75 mm, the second distance d2 may be approximately 2.46 mm, and the third distance d3 may be approximately 13.76 mm.

TABLE 5

| Distance | First State | Second State |
|---|---|---|
| First distance (d1) | 10.34 | 0.75 |
| Second distance (d2) | 4.35 | 2.46 |
| Third distance (d3) | 2.28 | 13.76 |

According to various embodiments, the F-number, composite effective focal length, and wide-angle of the second imaging optical system 400 may be altered based on the movement of the second lens group 405 and/or the third lens group 407. According to an embodiment (e.g., FIG. 8A or 8B), the F-number for the second imaging optical system 400 may range from 2.7 to 5.37, its composite effective focal length may range from 9.7 mm to 27.6 mm, and its wide-angle may range from 10.57 to 30.28 degrees. According to various embodiments, the second imaging optical system 400 may include an aperture (not shown). According to an embodiment, the amount of light reaching the second image sensor 490 may be modulated by adjusting the size of the aperture. According to an embodiment, the aperture may be positioned between the (2-2)th lens 420 and the (2-3)th lens 430. For example, the aperture may be disposed on the front surface 430a of the (2-3)th lens 430.

According to various embodiments, an electronic device (e.g., the electronic device 200 of FIG. 2) may include at least one of a magnet, a motor, a gear structure, or a hydraulic structure, and a processor (e.g., the processor 120 of FIG. 1) may move at least one of the second lens group 405 or the third lens group 407 by using at least one of the magnet, the motor, the gear structure, or the hydraulic structure. For example, the processor 120 may move at least one of the second lens group 405 or the third lens group 407 to adjust the angle of view of the second imaging optical system 400, based on a user input. As another example, the processor 120 may move the third lens group 407 for auto focusing (AF).

According to various embodiments, the electronic device 200 may satisfy Conditional Expression 2.

$$\frac{\left(SSW \times \frac{FOV_2W}{FOV_1}\right) \times 0.48}{ps1^2} > 8000000 \qquad \text{Conditional Expression 2}$$

wherein $FOV_1$ denotes the angle of view of the first imaging optical system 300, $FOV_2\ W$ denotes the angle of view at the wide-angle end of the second imaging optical system 400, and ps1 represents a sensor pixel size of the first image sensor 390.

In the electronic device 200 according to an embodiment (e.g., FIGS. 6 and 8A), $$\frac{\left(SSW \times \frac{FOV_2W}{FOV_1}\right) \times 0.48}{ps1^2}$$

may be about 14885185.

According to an embodiment, when $$\frac{\left(SSW \times \frac{FOV_2W}{FOV_1}\right) \times 0.48}{ps1^2}$$

is ≤8000000, a portion of the angle of view of the second imaging optical system 400 is smaller than that of the first imaging optical system 300. As a result, when the imaging optical systems 300 and 400 used by the electronic device 200 switch from the first imaging optical system 300 to the second imaging optical system 400, the image quality may decrease.

Figure 10A:
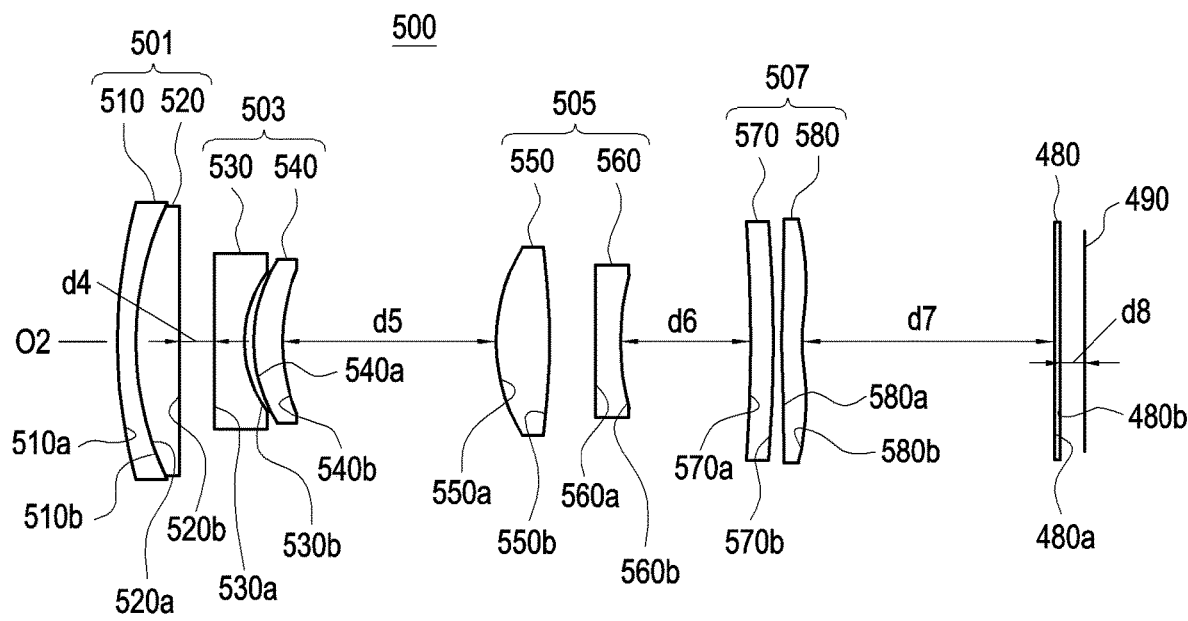
FIG. 10A is a cross-sectional view illustrating a second imaging optical system in a first state according to an embodiment of the disclosure.
Figure 10B:
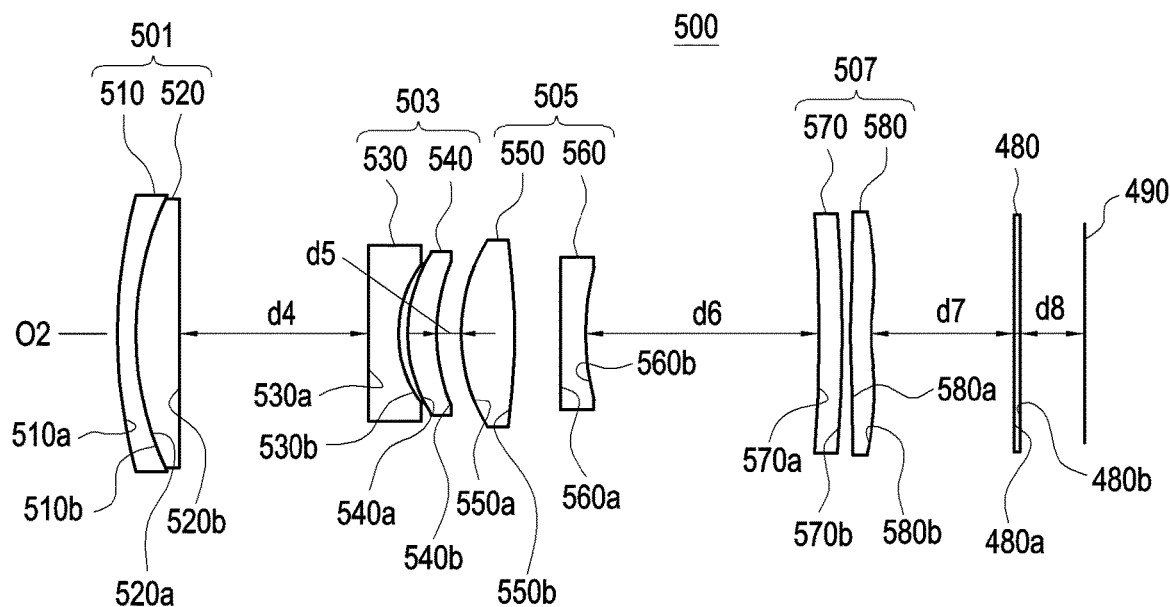
FIG. 10B is a schematic view illustrating a second imaging optical system in a second state according to an embodiment of the disclosure.

FIG. 10A is a cross-sectional view illustrating a second imaging optical system in a third state according to an embodiment of the disclosure, and FIG. 10B is a schematic view illustrating a second imaging optical system in a second state according to an embodiment of the disclosure.

Referring to FIGS. 10A and 10B, a second imaging optical system 500 may include a first lens group 501, a second lens group 503, a third lens group 505, a fourth lens group 507, a second optical filter 480, and a second image sensor 490. The configuration of the second imaging optical system 500 of FIGS. 10A and 10B may be entirely or partially the same as the configuration of the second imaging optical system 400 of FIGS. 5, 8A, and/or 8B. The configuration of the second optical filter 480 and the second image sensor 490 of FIGS. 10A and 10B may be entirely or partially the same as the configuration of the second optical filter 480 and the second image sensor 490 of FIGS. 8A and/or 8B.

According to various embodiments, the first lens group 501 may include at least one lens. For example, the first lens group 501 may include a (3-1)th lens 510 and a (3-2)th lens 520. According to an embodiment, the (3-1)th lens 510 and the (3-2)th lens 520 may be sequentially arranged along the second optical axis O2 in a direction toward the second image sensor 490 and/or the second lens group 503 from a reflective member (e.g., the reflective member 401 of FIGS. 8A and 8B). According to an embodiment, the first lens group 501 may be fixed to a second camera housing (e.g., the second camera housing 406 of FIG. 8A).

According to various embodiments, the second lens group 503 may include at least one lens. For example, the second lens group 503 may include a (3-3)th lens 530 and a (3-4)th lens 540. According to an embodiment, the (3-3)th lens 530 and the (3-4)th lens 540 may be sequentially arranged along the second optical axis O2 in a direction from the first lens group 501 toward the second image sensor 490 and/or the third lens group 505.

According to various embodiments, the third lens group 505 may include at least one lens. For example, the third lens group 505 may include a (3-5)th lens 550 and a (3-6)th lens 560. According to an embodiment, the (3-5)th lens 550 and the (3-6)th lens 560 may be sequentially arranged along the second optical axis O2 in a direction from the second lens group 503 toward the second image sensor 490. According to an embodiment, the third lens group 505 may be fixed to a second camera housing (e.g., the second camera housing 406 of FIG. 8A).

According to various embodiments, the fourth lens group 507 may include at least one lens. For example, the fourth lens group 507 may include a (3-7)th lens 570 and a (3-8)th lens 580. According to an embodiment, the (3-7)th lens 570 and the (3-8)th lens 580 may be sequentially arranged along the second optical axis O2 in a direction from the third lens group 505 toward the second image sensor 490.

According to various embodiments, an electronic device (e.g., the electronic device 200 of FIG. 2) may implement an auto focusing (AF) function by using at least one of the second lens group 503 or the fourth lens group 507. According to an embodiment, at least one of the second lens group 503 or the fourth lens group 507 may perform focus adjustment based on the distance between a subject and the second imaging optical system 500. For example, the second imaging optical system 500 may include an actuator (not shown) connected to the second lens group 503 and/or the fourth lens group 507, and the actuator may change the position of the second lens group 503 and/or the fourth lens group 507.

Table 6 below lists at least one of the radius of curvature, thickness or air gap, effective focal length, refractive index, or Abbe number of the (3-1)th lens 510, the (3-2)th lens 520, the (3-3)th lens 530, the (3-4)th lens 540, the (3-5)th lens 550, the (3-6)th lens 560, the (3-7)th lens 570, the (3-8)th lens 580, the second optical filter 480, and the second image sensor 490 of the second imaging optical system 500.

TABLE 6

| | radius of curvature | thickness or air gap | effective focal length | refractive index | Abbe number |
|---|---|---|---|---|---|
| 510a | 13.569 | 0.423 | −21.8485 | 1.84666 | 23.78 |
| 510b | 7.747 | 0.005 | | 1.514 | 42.84 |

TABLE 6-continued

| | radius of curvature | thickness or air gap | effective focal length | refractive index | Abbe number |
|---|---|---|---|---|---|
| 520a | 7.747 | 1.136 | 9.9618 | 1.7725 | 49.62 |
| 520b | −3902.82 | d4 | | | |
| 530a | 19.336 | 0.807 | −4.9162 | 1.5348 | 55.71 |
| 530b | 2.289 | 0.215 | | | |

TABLE 6-continued

| | radius of curvature | thickness or air gap | effective focal length | refractive index | Abbe number |
|---|---|---|---|---|---|
| 540a | 2.867 | 0.834 | 13.9653 | 1.651 | 21.49 |
| 540b | 3.687 | d5 | | | |
| 550a | 4.027 | 1.491 | 6.5618 | 1.497 | 81.61 |
| 550b | −15.269 | 1.234 | | | |
| 560a | 12.049 | 0.7 | −11.9067 | 1.6355 | 23.89 |
| 560b | 4.569 | d6 | | | |
| 570a | −11.405 | 0.6 | 48.0401 | 1.5441 | 56.07 |
| 570b | −8.099 | 0.2 | | | |
| 580a | 8.756 | 0.6 | 36.2283 | 1.615 | 25.95 |
| 580b | 13.964 | d7 | | | |
| 480a | infinity | 0.21 | | 1.5168 | 64.2 |
| 480b | infinity | d8 | | | |
| 490 | infinity | 0.423 | | | |

In Table 6, '510a' and '510b' refer to the front and rear surfaces of the (3-1)th lens 510, respectively, '520a' and '520b' refer to the front and rear surfaces of the (3-2)th lens 520, respectively, '530a' and '530b' refer to the front and rear surfaces of the (3-3)th lens 530, respectively, '540a' and '540b' refer to the front and rear surfaces of the (3-4)th lens 540, respectively, '550a' and '550b' refer to the front and rear surfaces of the (3-5)th lens 550, respectively, '560a' and '560b' refer to the front and rear surfaces of the (3-6)th lens 560, respectively, '570a' and '570b' refer to the front and rear surfaces of the (3-7)th lens 570, respectively, '580a' and '580b' refer to the front and rear surfaces of the (3-8)th lens 580, respectively, '480a' and '480b' refer to the front and rear surfaces of the second optical filter 480, respectively, and '490' refers to the image surface of the second image sensor 490. The units of the radius of curvature, thickness, and air gap in Table 6 may be mm. The front surface may refer to a surface facing a second direction (e.g., a +X direction) facing the outside of the second imaging optical system 500, and the rear surface may refer to a surface facing a third direction (e.g., a −X direction) opposite to the second direction. According to various embodiments, the second imaging optical system 500 may include at least one aspherical lens. For example, at least one of the (3-1)th lens 510, the (3-2)th lens 520, the (3-3)th lens 530, the (3-4)th lens 540, the (3-5)th lens 550, the (3-6)th lens 560, the (3-7)th lens 570, and the (3-8)th lens 580 may have at least one surface formed in an aspherical shape.

Table 7 below lists aspheric coefficients for at least one of the (3-1)th lens 510, the (3-2)th lens 520, the (3-3)th lens 530, the (3-4)th lens 540, the (3-5)th lens 550, the (3-6)th lens 560, the (3-7)th lens 570, or the (3-8)th lens 580. The second imaging optical system 500 of the third embodiment (e.g., FIG. 10A or 10B) may satisfy the conditions presented in Table 7 below.

TABLE 7

| | K | A | B | C | D | E | F |
|---|---|---|---|---|---|---|---|
| 510a | −1 | −7.854495E−03 | 3.155123E−04 | 3.754922E−05 | −4.054231E−06 | 0.000000E+00 | 0.000000E+00 |
| 530b | −0.31586 | −7.310148E−03 | 9.888613E−04 | −7.895940E−05 | 1.560959E−05 | 0.000000E+00 | 0.000000E+00 |
| 540a | 0 | −4.910731E−03 | −4.036709E−04 | −1.241560E−04 | −3.529569E−06 | 2.066953E−06 | 0.000000E+00 |
| 540b | −0.79683 | −8.628077E−03 | 8.342314E−04 | −1.512981E−04 | 8.235916E−06 | −6.690186E−07 | 0.000000E+00 |
| 560a | −32.3504 | −1.036512E−02 | 7.416744E−05 | 8.217023E−05 | −2.608164E−05 | 3.424870E−06 | 0.000000E+00 |
| 560b | −2.22501 | −8.799698E−03 | 1.006279E−03 | −9.004374E−05 | 1.196932E−05 | 2.878954E−07 | 0.000000E+00 |
| 570a | −1 | 7.434513E−04 | 1.552425E−03 | −1.114871E−04 | 8.225694E−06 | 3.503666E−07 | 0.000000E+00 |
| 570b | −1 | −1.916082E−03 | 2.237372E−03 | −4.507167E−05 | −3.206681E−05 | 1.795448E−06 | 0.000000E+00 |
| 580a | 0 | −5.752774E−03 | −2.756593E−04 | 2.630241E−04 | −4.911759E−05 | 2.654402E−06 | 0.000000E+00 |
| 580b | 0 | −3.864574E−03 | −1.298802E−03 | 3.660586E−04 | −4.855676E−05 | 2.347768E−06 | 0.000000E+00 |

In Table 7, '510a' refers to the front surface of the (3-1)th lens 510, '530b' refers to the rear surface of the (3-3)th lens 530, '540a' and '540b' refer to the front and rear surfaces of the (3-4)th lens 540, respectively, '560a' and '560b' refer to the front and rear surfaces of the (3-6)th lens 560, respectively, '570a' and '570b' refer to the front and rear surfaces of the (3-7)th lens 570, respectively, and '580a' and '580b' refer to the front and rear surfaces of the (3-8)th lens 580, respectively. According to various embodiments, the electronic device (e.g., the electronic device 200 of FIG. 2) may move at least one of the plurality of lens groups 501, 503, 505, and 507. According to an embodiment, at least one of the second lens group 503 or the fourth lens group 507 may slide relative to the first lens group 501, the third lens group 505, or the second image sensor 490. For example, at least one of the distances: a fourth distance d4 between the first lens group 501 and the second lens group 503, a fifth distance d5 between the second lens group 503 and the third lens group 505, a sixth distance d6 between the third lens group 505 and the fourth lens group 507, a seventh distance d7 between the fourth lens group 507 and the second optical filter 480, or an eighth distance d8 between the second optical filter 480 and the second image sensor 490 may be changed. According to an embodiment, it may be interpreted that the fourth distance d4 is a distance between the rear surface 520b of the (3-2)th lens 520 and the front surface 530a of the (3-3)th lens 530 on the second optical axis O2, the fifth distance d5 is a distance between the rear surface 540b of the (3-4)th lens 540 and the front surface 550a of the (3-5)th lens 550 on the second optical axis O2, the sixth distance d6 is a distance between the rear surface 560b of the (3-6)th lens 560 and the front surface 570a of the (3-7)th lens 570 on the second optical axis O2, and the seventh distance d7 is a distance between the rear surface 580b of the (3-8)th lens 580 and the second optical filter 480 on the second optical axis O2, and the eighth distance d8 is a distance between the rear surface 480b of the second optical filter 480 and the second image sensor 490 on the second optical axis O2.

Table 8 below lists the fourth distance d4 between the first lens group 501 and the second lens group 503, the fifth distance d5 between the second lens group 503 and the third lens group 505, the sixth distance d6 between the third lens group 505 and the fourth lens group 507, the seventh distance d7 between the fourth lens group 507 and the second optical filter 480, and the eighth distance d8 between the second optical filter 480 and the second image sensor 490, all of which are changed based on the angle of view of the second imaging optical system 500.

According to various embodiments, as the fourth distance d4, the fifth distance d5, the sixth distance d6, the seventh distance d7, or the eighth distance d8 is changed, the angle of view of the second imaging optical system 500 may be changed. For example, in the fourth state (e.g., FIG. 10B), the angle of view of the second imaging optical system 500 may be smaller than the angle of view of the third state (e.g., FIG. 10A). According to an embodiment, when zooming in, the second lens group 503 and the fourth lens group 507 may move in a third direction (e.g., the −X direction) toward the second image sensor 490, and the second optical filter 480 may move in a second direction (e.g., the +X direction) toward the first lens group 501. According to an embodiment, when zooming out, the second lens group 503 and the fourth lens group 507 may move in a second direction (e.g., the +X direction) toward the first lens group 501, and the second optical filter 480 may move in a third direction (e.g., the −X direction) toward the second image sensor 490. According to an embodiment, the second direction (e.g., the +X direction) may be substantially perpendicular to a first direction (e.g., the +Z direction) that a first image sensor (e.g., the first image sensor 390 of FIGS. 7A and 7B) of a first imaging optical system (e.g., the first imaging optical system 300 of FIG. 6) faces.

TABLE 8

| Distance | Third State | Fourth State |
|---|---|---|
| Fourth Distance (d4) | 0.99 | 6.89 |
| Fifth Distance (d5) | 6.47 | 0.57 |
| Sixth Distance (d6) | 3.55 | 7.15 |
| Seventh Distance (d7) | 7.75 | 2.85 |
| Eighth Distance (d8) | 0.55 | 1.84 |

According to an embodiment, when the second imaging optical system 500 is in the third state (e.g., FIG. 10A) to capture a subject at the first zoom magnification (e.g., 3 times), the fourth distance d4 may be approximately 0.99 mm, the fifth distance d5 may be approximately 6.47 mm, the sixth distance d6 may be approximately 3.55 mm, the seventh distance d7 may be approximately 7.75 mm, and the eighth distance d8 may be approximately 0.55 mm. According to an embodiment, when the second imaging optical system 500 is in the fourth state (e.g., FIG. 10B) to capture a subject at the second zoom magnification (e.g., 10 times), which is greater than the first zoom magnification, the fourth distance d4 may be approximately 6.89 mm, the fifth distance d5 may be approximately 0.57 mm, the sixth distance d6 may be approximately 7.15 mm, the seventh distance d7 may be approximately 2.85 mm, and the eighth distance d8 may be approximately 1.84 mm.

According to various embodiments, the F-number, composite effective focal length, and wide angle of the second imaging optical system 500 may change based on the movement of the second lens group 503 and/or the fourth lens group 507. According to an embodiment, the F-number of the second imaging optical system 500 corresponding to the third embodiment (e.g., FIG. 10A or 10B) may range from 3.7 to 4.5, the composite effective focal length of the second imaging optical system 500 may range from 11.45 mm to 28 mm, and the wide angle of the second imaging optical system 500 may range from 11 degrees to 28.2 degrees. According to an embodiment, the size (SST) (e.g., diagonal length) of the second image sensor 490 corresponding to the third embodiment (e.g., FIG. 10A or 10B) may be approximately 5.5 mm.

Figure 11A:
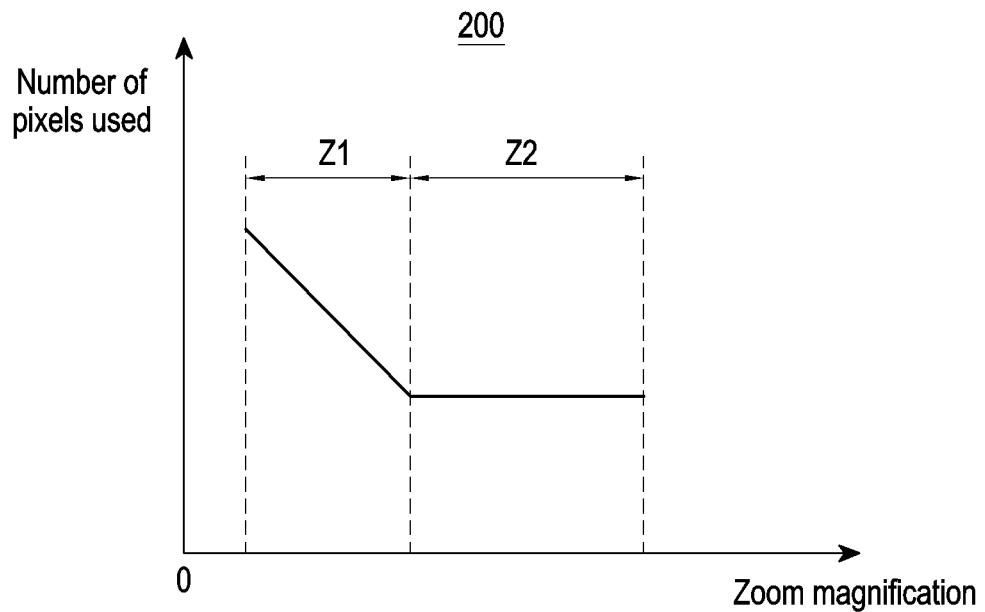
FIGS. 11A and 11B are diagrams illustrating the relationship between zoom magnification and the number of pixels used according to various embodiments of the disclosure.
Figure 11B:
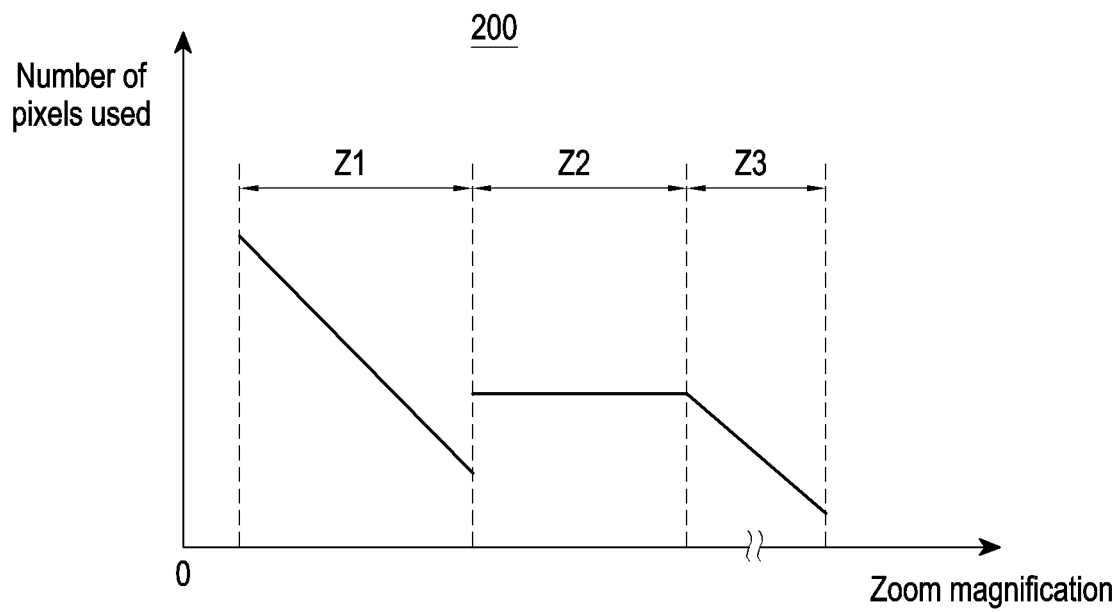

FIGS. 11A and 11B are diagrams illustrating a relationship between a zoom magnification and the number of pixels used according to various embodiments of the disclosure.

Referring to FIGS. 11A and 11B, with the use of digital zoom, the number of pixels used in the electronic device 200 may decrease as the zoom magnification increases, and with the use of optical zoom, the number of pixels used by the electronic device 200 may remain substantially constant. According to an embodiment, the horizontal axis of FIGS. 11A and 11B may refer to the zoom magnification in the electronic device 200, and the vertical axis may refer to the number of pixels being used in the electronic device 200.

According to various embodiments, based on a zoom magnification range (or an angle of view range), the electronic device 200 may switch imaging optical systems (e.g., the first imaging optical system 300 or the second imaging optical system 400 of FIG. 5). For example, in a first zoom magnification range z1 (e.g., a first angle of view range), the electronic device 200 may obtain an image of an external subject using the first imaging optical system (e.g., the first imaging optical system 300 of FIG. 5), and in a second zoom magnification range z2 (e.g., a second angle of view range) greater than the first zoom magnification range z1, the electronic device 200 may use the second imaging optical system (e.g., the second imaging optical system 400 of FIG. 5) to obtain an image of an external subject.

According to various embodiments, within the first zoom magnification range z1 (e.g., 1 to 3 times), the electronic device 200 may adjust the size of the image in the first imaging optical system 300 using digital zoom or crop. When adjusting the zoom magnification (or angle of view) with digital zoom or crop, the number of pixels used in the image may decrease as the zoom magnification increases.

According to various embodiments, within the second zoom magnification range z2 (e.g., 3 to 10 times) greater than the first zoom magnification range z1, the electronic device 200 may adjust the size of the image using optical zoom. For example, as the second lens group (e.g., the second lens group 405 of FIG. 8A) and/or the third lens group (e.g., the third lens group 407 of FIG. 8A) of the second imaging optical system 400 moves, the angle of view of the second imaging optical system 400 may change. According to an embodiment, when adjusting a zoom magnification or an angle of view using optical zoom, the number of pixels used in the image remains substantially constant, and the deterioration of the image quality may decrease.

According to various embodiments, as illustrated in FIG. 11B, within a third zoom magnification range z3 (e.g., 10 to 100 times) greater than the second zoom magnification range z2, the electronic device 200 may adjust the size of the image in the second imaging optical system 400 using digital zoom. For example, the processor (e.g., the processor 120 of FIG. 1) of the electronic device 200 may adjust the size of the image by using digital zoom in addition to the image whose angle of view has been adjusted with optical zoom. When adjusting the zoom magnification (or angle of view) using digital zoom, the number of pixels used in the image may decrease as the zoom magnification increases.

Figure 12:
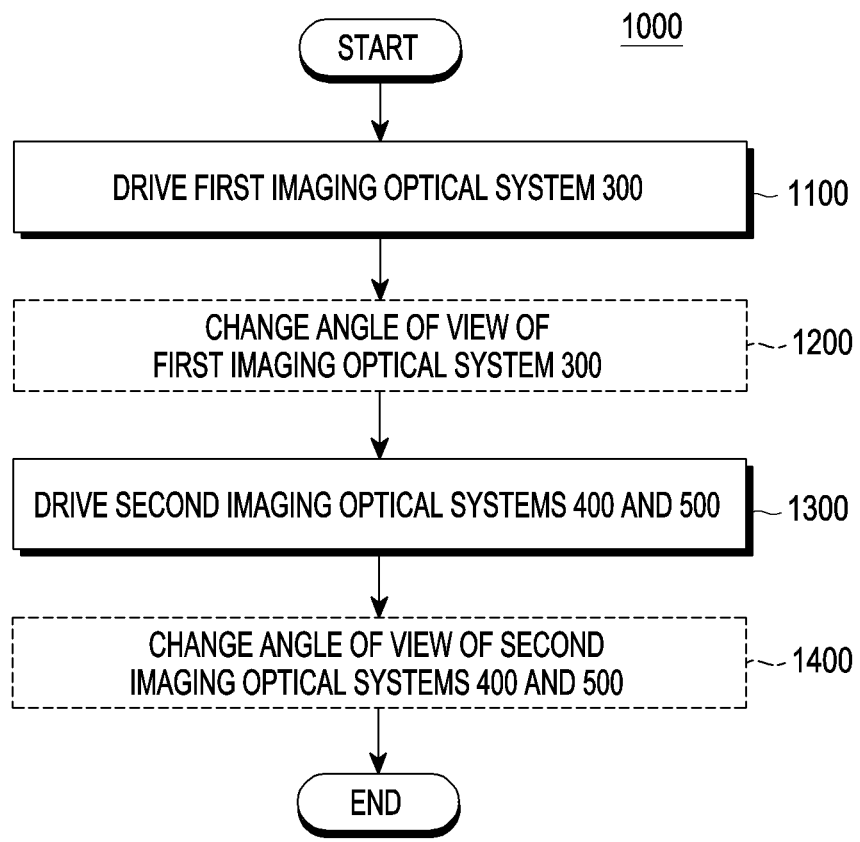
FIG. 12 is a flowchart illustrating the driving operation of an electronic device according to an embodiment of the disclosure.

FIG. 12 is a flowchart illustrating a driving operation of an electronic device according to an embodiment of the disclosure.

Referring to FIG. 12, a driving operation 1000 of an electronic device (e.g., the electronic device 200 of FIG. 2) may include an operation 1100 of driving a first imaging optical system (e.g., the first imaging optical system 300 of FIG. 6), an operation 1200 of changing the angle of view of the first imaging optical system 300, an operation 1300 of driving a second imaging optical system (e.g., the second imaging optical systems 400 and 500 of FIGS. 9A, 9B, 10A, and 10B), and/or an operation 1400 of changing the angle of view of the second imaging optical systems 400 and 500. The configurations of the first imaging optical system 300 and the second imaging optical systems 400 and 500 in FIG. 12 may be entirely or partially the same as the configurations of the first imaging optical system 300 and the second imaging optical system 400 in FIG. 5.

According to various embodiments, the first imaging optical system 300 or the second imaging optical systems 400 and 500 may be selectively used based on the angle of view range specified by the user. For example, when the user captures an angle of view that is reduced from the angle of view range of the first imaging optical system 300, the processor 120 may activate the second imaging optical systems 400 and 500.

According to various embodiments, the electronic device 200 may perform operation 1200 of changing the angle of view of the first imaging optical system 300 by using a processor (e.g., the processor 120 of FIG. 1). For example, the electronic device 200 may adjust the size of the image obtained using the first imaging optical system 300 by using digital zoom or crop.

According to various embodiments, the electronic device 200 may perform operation 1400 of changing the angle of view of the second imaging optical systems 400 and 500 using optical zoom. For example, the processor (e.g., the processor 120 of FIG. 1) may perform optical adjustments to the angle of view of the second imaging optical systems 400 and 500 by moving at least one of the lenses within the second imaging optical systems 400 and 500.

According to various embodiments of the disclosure, an electronic device (e.g., the electronic device 200 of FIG. 2) may comprise a first imaging optical system (e.g., the first imaging optical system 300 of FIG. 6) including a first image sensor (e.g., the first image sensor 390 of FIG. 6), and a second imaging optical system including a second image sensor (e.g., the second image sensor 490 of FIG. 8A) and a reflective member (e.g., the reflective member 401 of FIG. 8A), wherein the second imaging optical system includes a first lens group (e.g., the first lens group 403 of FIG. 8A), a second lens group (e.g., the second lens group 405 of FIG. 8A), and a third lens group (e.g., the third lens group 407 of FIG. 8A), which are sequentially arranged from the reflective member to the second image sensor, wherein the second lens group and the third lens group may be configured to slide with respect to the first lens group, and the first imaging optical system and the second imaging optical system may be configured to satisfy Conditional Expression 1.

According to various embodiments, the electronic device may be configured to satisfy Conditional Expression 2.

According to various embodiments, the second lens group may have a positive (+) refractive power, and the third lens group may have a negative (−) refractive power.

According to various embodiments, the electronic device may further comprise a processor configured to capture an object outside the electronic device using the first imaging optical system in a first zoom magnification range, and to capture an object outside the electronic device using the second imaging optical system in a second zoom magnification range that is greater than the first zoom magnification range.

According to various embodiments, the processor may be configured to adjust a size of an image obtained from the first imaging optical system by using digital zoom or crop in the first zoom magnification range.

According to various embodiments, the processor may be configured to adjust a size of an image obtained from the second imaging optical system by using digital zoom in a third zoom magnification range that is greater than the second zoom magnification range.

According to various embodiments, the second lens group may be configured to move in a second direction (e.g., the +X direction in FIG. 8A) toward the first lens group when zooming in, and to move in a third direction (e.g., the −X direction in FIG. 8A) toward the second image sensor when zooming out.

According to various embodiments, the third lens group may be configured to perform focus adjustment based on a distance between a subject and the second imaging optical system.

According to various embodiments, the first lens group may comprise a (2-1)th lens (e.g., the (2-1)th lens 410 in FIG. 9A) and a (2-2)th lens (e.g., the (2-2)th lens 420 in FIG. 9A), which are sequentially arranged from the reflective member, the second lens group may comprise a (2-3)th lens (e.g., the (2-3)th lens 430 in FIG. 9A), a (2-4)th lens (e.g., the (2-4)th lens 440 in FIG. 9A), and a (2-5)th lens (e.g., the (2-5)th lens 450 in FIG. 9A), which are sequentially arranged from the first lens group, and the third lens group comprises a (2-6)th lens (e.g., the (2-6)th lens 460 in FIG. 9A) and a (2-7)th lens (e.g., the (2-7)th lens 470 in FIG. 9A), which are sequentially arranged from the second lens group.

According to various embodiments, the first image sensor of the first imaging optical system faces a first direction, and the reflective member may comprise a first reflective member surface (e.g., the first reflective member surface 401a in FIG. 8A) facing the first direction; a second reflective member surface (e.g., the second reflective member surface 401b in FIG. 8A) facing a third direction (e.g., the third direction (−X direction) in FIG. 8A) substantially perpendicular to the first direction; and a third reflective member surface (e.g., the third reflective member surface 401c in FIG. 8A) extending from the first reflective member surface to the second reflective member surface and configured to transmit at least a portion of light incident on the first reflective member surface to the second reflective member surface.

According to various embodiments, at least one of the first imaging optical system or the second imaging optical system may include an aspherical lens with at least one aspherical surface.

According to various embodiments, the electronic device may further comprise a housing (e.g., the housing 210 of FIG. 2) configured to accommodate at least a portion of the first imaging optical system and the second imaging optical system; and a display (e.g., the display 220 of FIG. 2) disposed on the housing.

According to various embodiments, the housing may include a front plate (e.g., the front plate 202 of FIG. 2) and a rear plate (e.g., the rear plate 280 of FIG. 4), wherein the first imaging optical system and the second imaging optical system may be visually exposed to the outside of the electronic device through an opening (e.g., the opening 282 of FIG. 4) formed in the rear plate.

According to various embodiments, an F-number of the first imaging optical system may be smaller than an F-number of the second imaging optical system, and a composite effective focal length of the first imaging optical system may be shorter than a composite effective focal length of the second imaging optical system.

According to various embodiments, the electronic device may further comprise an optical filter (e.g., the first optical filter 380 in FIG. 6 and/or the second optical filter 480 in FIG. 9A) including at least one of a low pass filter, an infrared filter, or a cover glass.

According to various embodiments, the electronic device (e.g., the electronic device 200 in FIG. 2) may comprise a first image sensor (e.g., the first image sensor 390 in FIG. 6), a first imaging optical system (e.g., the first imaging optical system 300 in FIG. 5) for capturing a first angle of view range (e.g., the first zoom magnification range Z1 in FIG. 11A), a second image sensor (e.g., the second image sensor 490 in FIG. 8A), a reflective member (e.g., the reflective member 401 in FIG. 8A), a second imaging optical system (e.g., the second imaging optical system 400 in FIG. 5) for capturing a second angle of view range that is smaller than the first angle of view range, and a processor (e.g., the processor 120 in FIG. 1) configured to adjust a size of an image in which an external object is captured using a crop in the first angle of view range, wherein the second imaging optical system may include a first lens group (e.g., the first lens group 403 in FIG. 8A), a second lens group (e.g., the second lens group 405 in FIG. 8A), and a third lens group (e.g., the third lens group 407 in FIG. 8A) that are arranged sequentially from the reflective member to the second image sensor, wherein the second lens group and the third lens group may be configured to slide with respect to the first lens group in the second angle of view range, and the first imaging optical system and the second imaging optical system may be configured to satisfy Conditional Expression 1.

According to various embodiments, the electronic device may be configured to satisfy Conditional Expression 2.

According to various embodiments, the second lens group may have a positive (+) refractive power, and the third lens group may have a negative (−) refractive power.

According to various embodiments, the first lens group may include a (2-1)th lens (e.g., the (2-1)th lens 410 of FIG. 9A) and a (2-2)th lens (e.g., the (2-2)th lens 420 of FIG. 9A) sequentially arranged from the reflective member, the second lens group may include a (2-3)th lens (e.g., the (2-3)th lens 430 of FIG. 9A), a (2-4)th lens (e.g., the (2-4)th lens 440 of FIG. 9A), and a (2-5)th lens (e.g., the (2-5)th lens 450 of FIG. 9A) sequentially arranged from the first lens group, and the third lens group may include a (2-6)th lens (e.g., the (2-6)th lens 460 of FIG. 9A) and a (2-7)th lens (e.g., the (2-7)th lens 470 of FIG. 9A) sequentially arranged from the second lens group.

According to various embodiments, the second lens group may be configured to move in a second direction (e.g., the second direction (the +X direction) in FIG. 8A) toward the first lens group when zooming in, and to move in a third direction (e.g., the third direction (the −X direction) in FIG. 8A) toward the second image sensor when zooming out.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
 a first imaging optical system including a first image sensor; and
 a second imaging optical system comprising:
  a second image sensor,
  a reflective member,
  a first lens group,
  a second lens group, and
  a third lens group,
 wherein the first lens group, the second lens group, and the third lens group are sequentially arranged from the reflective member to the second image sensor,
 wherein the second lens group and the third lens group are configured to slide with respect to the first lens group,
 wherein the first imaging optical system and the second imaging optical system are configured to satisfy the following conditional expression:

$$\frac{SSW}{SST} > 2,$$

and
 wherein SSW denotes a size of the first image sensor and SST denotes a size of the second image sensor,
 wherein the electronic device is configured to satisfy the following conditional expression:

$$\frac{\left(SSW \times \frac{FOV_2W}{FOV_1}\right) \times 0.48}{ps1^2} > 8000000,$$

and
 wherein $FOV_1$ denotes an angle of view of the first imaging optical system, $FOV_2W$ denotes an angle of view of a wide-angle end of the second imaging optical system, and ps1 denotes a sensor pixel size of the first image sensor.

2. The electronic device of claim 1, wherein the second lens group has a positive (+) refractive power, and the third lens group has a negative (−) refractive power.

3. The electronic device of claim 1, further comprising:
 a processor configured to:
  capture an object outside the electronic device by using the first imaging optical system in a first zoom magnification range, and
  capture the object outside the electronic device by using the second imaging optical system in a second zoom magnification range that is greater than the first zoom magnification range.

4. The electronic device of claim 3, wherein the processor is further configured to:
 adjust a size of an image obtained from the first imaging optical system by using digital zoom or crop in the first zoom magnification range.

5. The electronic device of claim 3, wherein the processor is further configured to:
 adjust a size of an image obtained from the second imaging optical system by using digital zoom in a third zoom magnification range that is greater than the second zoom magnification range.

6. The electronic device of claim 1, wherein the second lens group is configured to move in a second direction toward the first lens group while zooming in, and move in a third direction toward the second image sensor while zooming out.

7. The electronic device of claim 1, wherein the third lens group is configured to perform focus adjustment based on a distance between a subject and the second imaging optical system.

8. The electronic device of claim 1,
wherein the first lens group comprises a (2-1)th lens and a (2-2)th lens that are sequentially arranged from the reflective member,
wherein the second lens group comprises a (2-3)th lens, a (2-4)th lens, and a (2-5)th lens that are sequentially arranged from the first lens group, and
wherein the third lens group comprises a (2-6)th lens and a (2-7)th lens that are sequentially arranged from the second lens group.

9. The electronic device of claim 1,
wherein the first image sensor of the first imaging optical system faces a first direction, and
wherein the reflective member comprises:
a first reflective member surface facing the first direction,
a second reflective member surface facing a third direction substantially perpendicular to the first direction, and
a third reflective member surface extending from the first reflective member surface to the second reflective member surface and configured to transmit at least a portion of light incident on the first reflective member surface to the second reflective member surface.

10. The electronic device of claim 1, wherein at least one of the first imaging optical system or the second imaging optical system includes an aspherical lens with at least one aspherical surface.

11. The electronic device of claim 1, further comprising:
a housing configured to accommodate at least a portion of the first imaging optical system and the second imaging optical system; and
a display disposed on the housing.

12. The electronic device of claim 11,
wherein the housing includes a front plate and a rear plate, and
wherein the first imaging optical system and the second imaging optical system are visually exposed to an outside of the electronic device through an opening formed in the rear plate.

13. The electronic device of claim 1,
wherein a first F-number of the first imaging optical system is smaller than a second F-number of the second imaging optical system, and
wherein a composite effective focal length of the first imaging optical system is shorter than a composite effective focal length of the second imaging optical system.

14. The electronic device of claim 1, further comprising:
an optical filter including at least one of a low pass filter, an infrared filter, or a cover glass.

* * * * *